US009790868B2

(12) United States Patent
Huang et al.

(10) Patent No.: US 9,790,868 B2
(45) Date of Patent: Oct. 17, 2017

(54) APPARATUS AND METHOD FOR IGNITING A GASEOUS FUEL IN A DIRECT INJECTION INTERNAL COMBUSTION ENGINE

(71) Applicant: Westport Power Inc., Vancouver (CA)

(72) Inventors: Jian Huang, Richmond (CA); Sandeep Munshi, Delta (CA); Gordon P. McTaggart-Cowan, Vancouver (CA); David R. Wagner, Vancouver (CA)

(73) Assignee: Westport Power Inc., Vancouver (CA)

( * ) Notice: Subject to any disclaimer, the term of this patent is extended or adjusted under 35 U.S.C. 154(b) by 304 days.

(21) Appl. No.: 14/452,728

(22) Filed: Aug. 6, 2014

(65) Prior Publication Data

US 2015/0020769 A1 Jan. 22, 2015
US 2016/0186673 A9 Jun. 30, 2016

Related U.S. Application Data

(63) Continuation of application No. PCT/CA2013/050088, filed on Feb. 5, 2013.

(30) Foreign Application Priority Data

Feb. 7, 2012 (CA) ...................................... 2767247

(51) Int. Cl.
*F02D 19/06* (2006.01)
*F02B 7/08* (2006.01)
(Continued)

(52) U.S. Cl.
CPC .............. *F02D 19/061* (2013.01); *F02B 7/08* (2013.01); *F02B 23/0639* (2013.01);
(Continued)

(58) Field of Classification Search
CPC .. F02D 19/061; F02D 19/024; F02D 41/0027; F02D 41/403; F02D 19/0644;
(Continued)

(56) References Cited

U.S. PATENT DOCUMENTS 4,864,989 A * 9/1989 Markley ............... F02B 17/005
 123/267
5,144,924 A * 9/1992 Paro ......................... F02B 7/06
 123/275
(Continued)

FOREIGN PATENT DOCUMENTS

| DE | 10355024 | 6/2005 |
| DE | 10355024 A1 | 6/2005 |
| EP | 1983169 A1 | 10/2008 |

OTHER PUBLICATIONS

Search Report issued by EPO May 10, 2016 in connection with co-pending Europe Application No. 13747072.0.
(Continued)

*Primary Examiner* — Sizo Vilakazi
(74) *Attorney, Agent, or Firm* — Carie C. Mager; C. Larry Kyle

(57) ABSTRACT

An apparatus and method for igniting a gaseous fuel directly introduced into a combustion chamber of an internal combustion engine comprises steps of heating a space near a fuel injector nozzle; introducing a pilot amount of the gaseous fuel in the combustion chamber during a first stage injection event; controlling residency of the pilot amount in the space such that a temperature of the pilot amount increases to an auto-ignition temperature of the gaseous fuel whereby ignition occurs; introducing a main amount of the gaseous fuel during a second stage injection event after the first stage injection event; and using heat from combustion of the pilot amount to ignite the main amount.

42 Claims, 19 Drawing Sheets

(51) Int. Cl.
| | |
|---|---|
| *F02B 23/06* | (2006.01) |
| *F02D 19/02* | (2006.01) |
| *F02D 41/00* | (2006.01) |
| *F02D 41/40* | (2006.01) |
| *F02M 21/02* | (2006.01) |
| *F02D 41/38* | (2006.01) |
| *F02P 19/02* | (2006.01) |
| *F02M 45/08* | (2006.01) |
| *F02M 61/08* | (2006.01) |
| *F02M 61/18* | (2006.01) |
| *F02M 43/04* | (2006.01) |
| *F02M 53/04* | (2006.01) |
| *F02D 19/10* | (2006.01) |
| *F02M 21/06* | (2006.01) |
| *F02B 23/10* | (2006.01) |

(52) U.S. Cl.
CPC ...... *F02B 23/0654* (2013.01); *F02B 23/0669* (2013.01); *F02D 19/024* (2013.01); *F02D 19/0644* (2013.01); *F02D 19/0647* (2013.01); *F02D 19/0692* (2013.01); *F02D 41/0027* (2013.01); *F02D 41/3827* (2013.01); *F02D 41/403* (2013.01); *F02M 21/0263* (2013.01); *F02M 21/0275* (2013.01); *F02M 43/04* (2013.01); *F02M 45/086* (2013.01); *F02M 53/046* (2013.01); *F02M 61/08* (2013.01); *F02M 61/182* (2013.01); *F02M 61/1813* (2013.01); *F02M 61/1826* (2013.01); *F02P 19/026* (2013.01); *F02B 2023/103* (2013.01); *F02D 19/10* (2013.01); *F02M 21/0215* (2013.01); *F02M 21/0269* (2013.01); *F02M 21/06* (2013.01); *Y02T 10/125* (2013.01); *Y02T 10/32* (2013.01); *Y02T 10/36* (2013.01); *Y02T 10/44* (2013.01)

(58) Field of Classification Search
CPC ............. F02D 19/0647; F02D 19/0692; F02D 41/3827; F02B 7/08; F02B 23/0639; F02B 23/0669; F02M 21/0263; F02M 21/0275; F02M 45/086; F02M 61/08; F02P 19/026
See application file for complete search history.

(56) References Cited

U.S. PATENT DOCUMENTS

| | | | |
|---|---|---|---|
| 5,329,901 A | 7/1994 | Onishi | |
| 5,996,558 A | 12/1999 | Ouellette et al. | |
| 6,616,070 B1 | 9/2003 | Kunkulagunta | |
| 6,640,773 B2 | 11/2003 | Ancimer et al. | |
| 6,854,438 B2 | 2/2005 | Hilger et al. | |
| 6,901,915 B2 | 6/2005 | Winter et al. | |
| 6,955,154 B1 | 10/2005 | Douglas | |
| 7,040,281 B2 | 5/2006 | Crawford et al. | |
| 7,281,514 B2 | 10/2007 | Hill et al. | |
| 7,822,530 B2 | 10/2010 | Shinagawa et al. | |
| 2004/0069267 A1* | 4/2004 | Hilger | F02M 21/0269 123/260 |
| 2005/0217639 A1* | 10/2005 | Hill | F02B 23/0651 123/298 |
| 2005/0257769 A1* | 11/2005 | Li | F02B 7/06 123/299 |
| 2009/0255499 A1 | 10/2009 | Sasaki et al. | |
| 2011/0042476 A1 | 2/2011 | McAlister | |
| 2011/0088654 A1* | 4/2011 | Courtoy | F02D 19/0647 123/299 |

OTHER PUBLICATIONS

Search report issued by SIPO Mar. 11, 2016 in connection with co-pending China Application No. 201380016946.0.
Office Action issued on Jun. 11, 2012, in connection with Canadian Patent Application No. 2,767,247, from which the present application claims priority benefits.
Office Action issued on Feb. 15, 2013, in connection with Canadian Patent Application No. 2,767,247, from which the present application claims priority benefits.
International Search Report and Written Opinion of the International Searching Authority issued on Mar. 11, 2013, in connection with underlying International Application No. PCT/CA2013/050088.
International Preliminary Report on Patentability and Written Opinion of the International Bureau issued on Aug. 12, 2014 in connection with underlying International Application No. PCT/CA2013/050088.
Office Action issued on Jun. 11, 2012, in connection with Canadian Patent Application No. 2,767,247.
Office Action issued on Feb. 15, 2013, in connection with Canadian Patent Application No. 2,767,247.
International Search Report and Written Opinion of the International Searching Authority issued on Mar. 11, 2013, in connection with International Application No. PCT/CA2013/050088.
International Preliminary Report on Patentability and Written Opinion of the International Bureau issued on Aug. 12, 2014 in connection with International Application No. PCT/CA2013/050088.

* cited by examiner

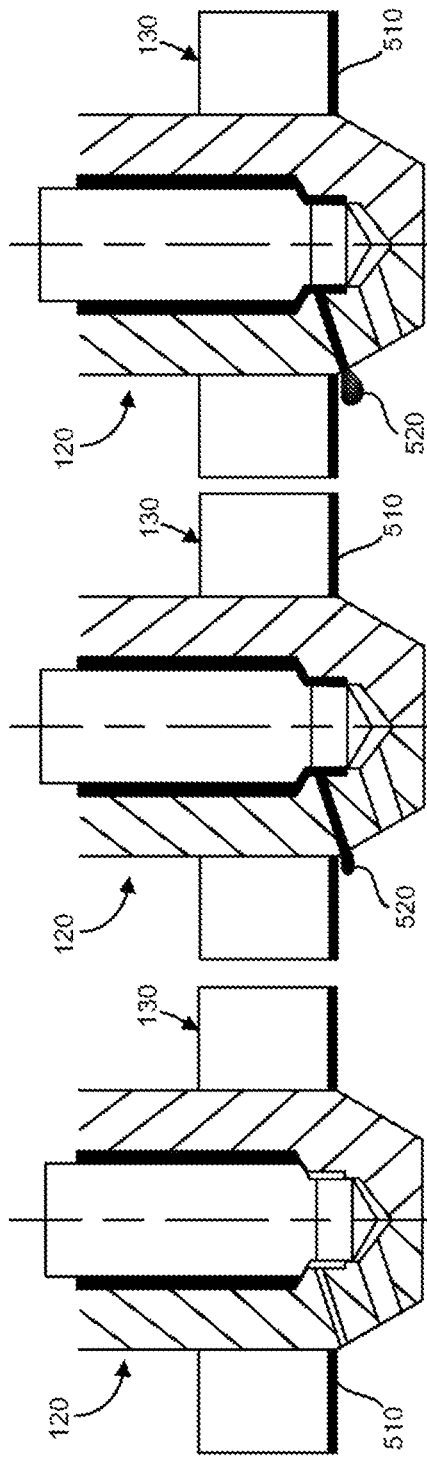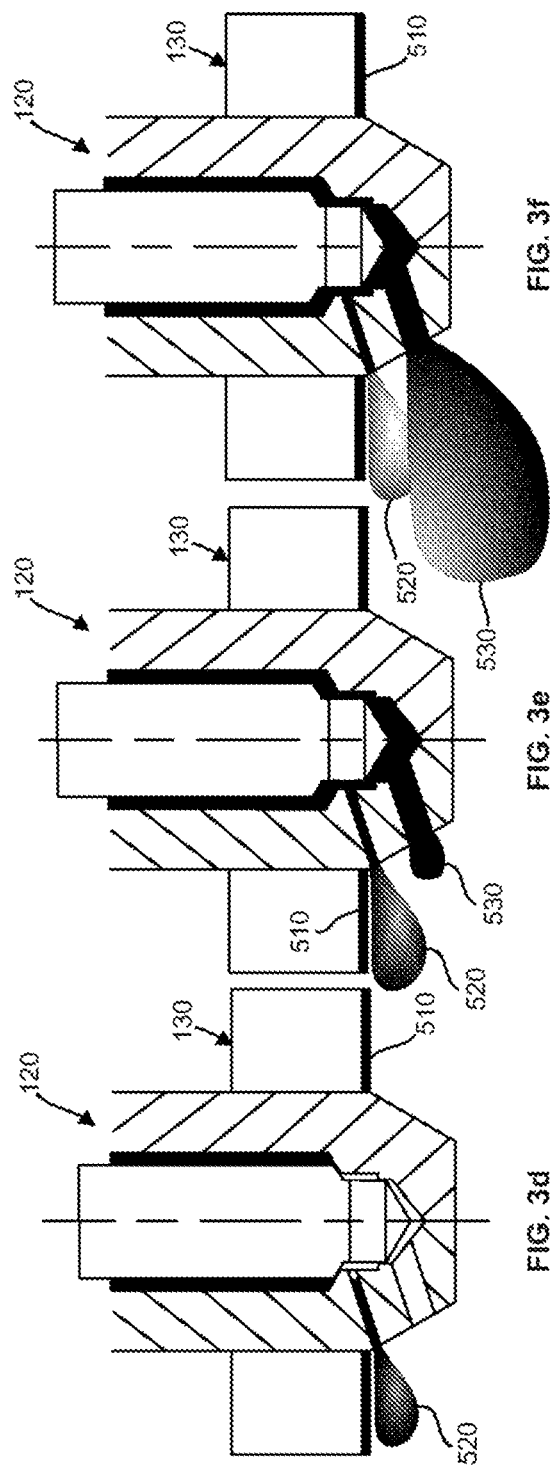

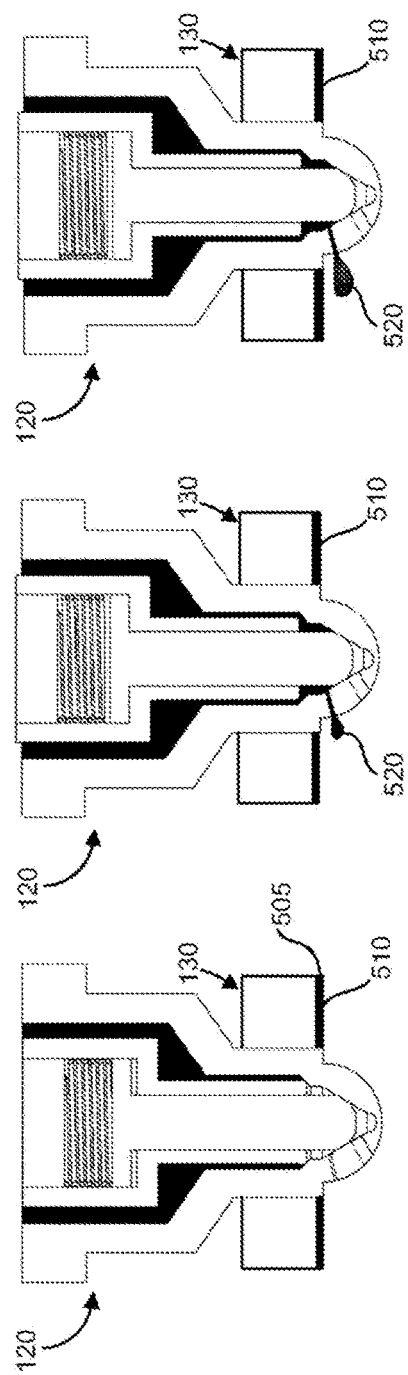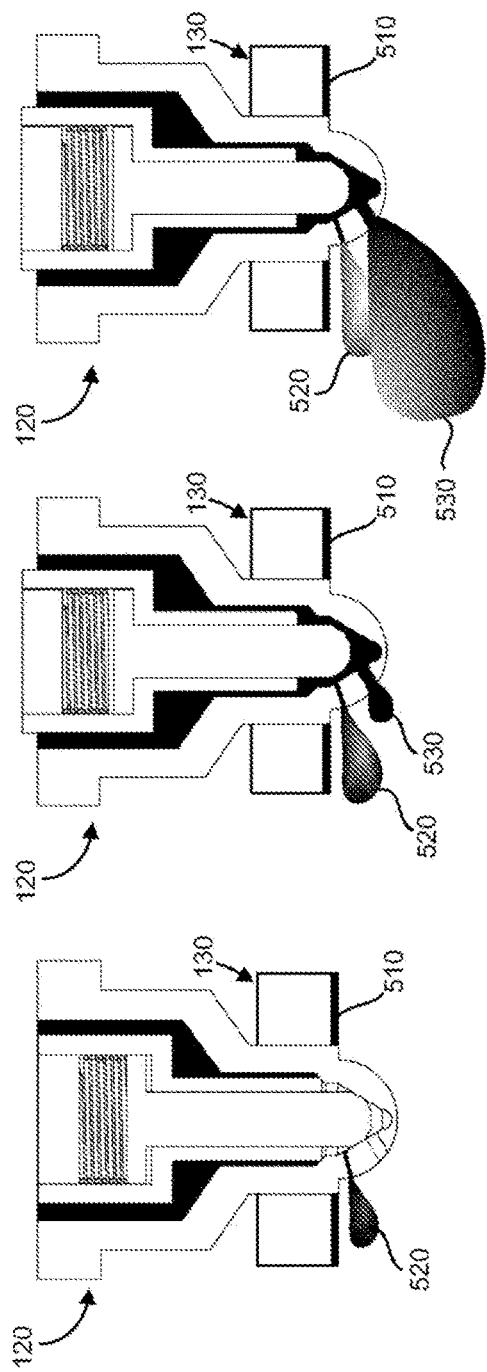

| Engine Operating Conditions | Case | Model | Heated Surface Temperature [K] | Pilot Flow Rate | Pilot1-SOI [°BTDC] | Pilot1 Quantity [mg] | Pilot2-SOI [°BTDC] | Pilot2 Quantity [mg] | Ignition |
|---|---|---|---|---|---|---|---|---|---|
| Low Load (1200RPM, 25% Load) | 1 | 1 | 1600 | LPFR | 30 | 5 | N/A | 0 | Y |
| | 2 | 1 | 1800 | LPFR | 30 | 10 | N/A | 0 | Y |
| | 3 | 1 | Spark @ 20 BTDC | LPFR | 30 | 5 | N/A | 0 | Y |
| | 4 | 1 | 1600 | LPFR | 30 | 5 | N/A | 0 | N |
| | 5 | 1 | 1600 | LPFR | 30 | 10 | N/A | 0 | N |
| | 6 | 1 | 1600 | LPFR | 50 | 5 | 30 | 5 | Y |
| High Load (1500RPM, 100% Load) | 7 | 1 | 1800 | LPFR | 30 | 10 | N/A | 0 | Y |
| | 8 | 1 | 1800 | HPFR | 30 | 10 | N/A | 0 | Y |
| | 9 | 1 | 1800 | HPFR | 50 | 10 | N/A | 0 | Y |
| | 10 | 2 | 1800 | LPFR | 0 | 0 | N/A | 0 | N |
| | 11 | 3 | 1800 | LPFR | 30 | 2.5 | N/A | 0 | N |

FIG. 13

APPARATUS AND METHOD FOR IGNITING A GASEOUS FUEL IN A DIRECT INJECTION INTERNAL COMBUSTION ENGINE

CROSS-REFERENCE TO RELATED APPLICATIONS

This application is a continuation of International Application No. PCT/CA2013/050088 having an international filing date of Feb. 5, 2013, entitled "Apparatus And Method For Igniting A Gaseous Fuel In A Direct Injection Internal Combustion Engine". The '088 international application claimed priority benefits, in turn, from Canadian Patent Application No. 2,767,247 filed on Feb. 7, 2012. The '088 international application is hereby incorporated by reference herein in its entirety.

FIELD OF THE INVENTION

The present invention relates to an apparatus and method for introducing and igniting a gaseous fuel in a Diesel-cycle internal combustion engine. The gaseous fuel is directly injected into a combustion chamber of the engine where a heated surface assists with ignition.

BACKGROUND OF THE INVENTION

Engines in which natural gas is directly injected into combustion chambers have achieved limited commercial success in the trucking industry. Diesel-cycle engines are employed in this industry due to their high thermal efficiency which is the highest of any internal combustion engine. The thermal efficiency results from high compression ratios that can be in the range of 15:1 to 22:1, as compared to a typical compression ratio for a gasoline engine of 10:1. It has been discovered that when natural gas is injected late in the compression stroke and ignited the power produced is comparable to when these engines burn diesel fuel, but with lower overall emissions. Considering also the lower cost of natural gas compared to diesel, the adoption of natural gas in the trucking industry has seen steady but limited growth.

Natural gas, whose primary constituent is methane, has a much higher auto-ignition temperature than diesel fuel. As used herein, the auto-ignition temperature is the lowest temperature at which a substance will spontaneously ignite without an external ignition source, such as a flame or a spark. For example, the auto-ignition temperature of normal diesel fuel in a normal atmosphere is approximately 210° C., and for natural gas it is approximately 540° C. depending upon the fuel quality. Due to the difference in auto-ignition temperatures, natural gas does not reliably ignite from the heat of compression like diesel fuel for the range of compression ratios previously mentioned. As a result an ignition source is required to ignite natural gas in a Diesel-cycle engine where natural gas is directly injected late in the compression stroke.

Diesel fuel can be used as an ignition source for natural gas. A small amount of diesel fuel injected into the combustion chamber auto-ignites due to the heat of compression producing a flame that then ignites the natural gas. The amount of diesel fuel employed in pilot injections ranges preferably between 5% and 10% of the total fuel consumed on an energy equivalent basis. This solution although effective and employed extensively in the heavy duty trucking industry adds cost and complexity to the engine that now needs to support two fuel systems, which reduces overall fuel system reliability. Two storage vessels for fuel are required along with the associated piping and pumping facilities to deliver these fuels to the fuel injection system on the engine, which now must include either two fuel injectors or a more complicated dual-fuel injector for each cylinder. In markets where operating costs associated with diesel fuel are substantial, such as the heavy duty trucking industry, these added system costs are more than offset by the savings in fuel costs.

Glow plugs are another ignition source for natural gas in direct injection engines. They are finger-shaped pieces of metal that have a heating element in their tip. A surface at the tip heats when a current passes through the heating element due to its electrical resistance and begins to emit light in the visible spectrum, hence the term "glow" plug. After the tip has heated sufficiently, natural gas is injected directly on the surface where it combusts. Normally, the fuel injector has several orifices where natural gas jets emerge during injection events. Since the glow plug is located some distance from the nozzle, only one of these gas jets is ignited by the glow plug on impact. The other gas jets ignite through interaction with the ignited gas jet. This interaction can occur when the other gas jets are diverted towards the ignited jet by hitting the cylinder wall. In this manner it is difficult to control the heat release rate. As a result, the flame produced may not propagate sufficiently to burn all the fuel due to inadequate mixing. Such systems suffer from high unburned hydrocarbon (UHC) emissions and have high cycle-to-cycle variability, which makes it difficult to meet ever more stringent emission regulations. Glow plugs have several failure modes which are generally related to effects from operating temperature and inconsistent combustion. For example, too much electrical power delivered to the glow plug from the engine battery causes excessive heating leading to elevated temperatures beyond what the glow plug is capable of providing. Driving circuit failure can lead to this power overload condition. Poor fuel injection timing, that is fuel injected too early or too late, leads to poor combustion performance which causes carbon deposit build-up on the glow plug surface. General fouling of the glow plug occurs when contaminants in the fuel supply are not properly filtered and are let into the combustion chamber. Both carbon deposit and contaminant build-up phenomena further worsen combustion performance since the heat delivered to the fuel is retarded by the build-up. These failure modes can affect glow plug performance prior to failure which can contribute to even greater emission levels. Glow plugs operate at very high temperatures, for example at 1,350° C., which in general reduces the operating life due to heat fatigue.

The shortcomings of conventional techniques for igniting gaseous fuels in Diesel-cycle engines have limited the market adoption of using these fuels in place of diesel. The present application provides a new and improved apparatus and method for igniting gaseous fuels in Diesel-cycle internal combustion engines.

SUMMARY OF THE INVENTION

An improved method for igniting a gaseous fuel directly introduced into a combustion chamber of an internal combustion engine comprises steps of heating a space near a fuel injector nozzle; introducing a pilot amount of the gaseous fuel in the combustion chamber during a first stage injection event; controlling residency of the pilot amount in the space such that a temperature of the pilot amount increases to an auto-ignition temperature of the gaseous fuel whereby ignition occurs; introducing a main amount of the gaseous fuel during a second stage injection event after the first stage injection event; and using heat from combustion of the pilot amount to ignite the main amount. In a preferred embodiment, the pilot amount is introduced through a plurality of pilot injection passageways and forms multiple pilot jets whereby the gaseous fuel in each of the pilot jets auto-ignites. The gaseous fuel can be one of natural gas, methane, propane, ethane, biogas, landfill gas, hydrogen and mixtures of these fuels. The method further comprises steps of absorbing heat from a heat source into a heat absorbent material; and transferring the absorbed heat from a surface of the heat absorbent material to the space. The heat source can be at least one of a heating coil, an induction heater, combustion heat and compression heat. The pilot amount of the gaseous fuel can reach the auto-ignition temperature before or after impacting the surface. The second stage injection event can occur before or after the pilot amount of the gaseous fuel ignites. The pilot amount can be within a range of 2% to 20% of total gaseous fuel introduced into the combustion chamber, and more preferably it is within a range of 2% to 10% of total gaseous fuel introduced, and most preferably it is within a range of 2% to 8% of total gaseous fuel introduced. The residency of the pilot amount in the space can be controlled by selecting a size of a pilot injection passageway through which the pilot amount is introduced into the combustion chamber forming a pilot jet such that the pilot jet entrains sufficient air to retard its progress in the space. The residency can also be controlled by controlling injection flow rate such that the pilot jet entrains sufficient air to retard its progress in the space. The injection flow rate can be controlled by predetermining a cross-sectional area of a pilot injection passageway through which the pilot amount is introduced. Residency can also be controlled by impacting the pilot amount against a diverting member whereby the residency of the pilot amount in the space is increased. The introduction of the gaseous fuel into the combustion chamber can be stopped between the first stage injection event and the second stage injection event, or the gaseous fuel can be continuously introduced between the first stage injection even and the second stage injection event. The method can comprise the further steps of introducing a second pilot amount of the gaseous fuel before the first stage injection event; igniting the second pilot amount with an external ignition source such as a spark whereby combustion of the second pilot amount heats the space. The second stage injection event can occur before the first stage injection event, instead of occurring after. This allows the main fuel to premix before ignition. The main amount of gaseous fuel can be introduced into an intake manifold upstream from an intake valve of the combustion chamber, instead of directly introducing it into the combustion chamber. The gaseous fuel can be co-injected with a second fuel such that ignitability of the gaseous fuel is improved. In one preferred embodiment the second fuel can be introduced into the combustion chamber separately from the gaseous fuel, and in another preferred embodiment the second fuel forms a mixture with the gaseous fuel such that the mixture is introduced into the combustion chamber.

An improved apparatus for igniting a gaseous fuel in a combustion chamber of an internal combustion engine comprises a fuel injector for directly introducing the gaseous fuel into the combustion chamber, the fuel injector comprises a pilot injection passageway and a main injection passageway; a heat source for heating a space near the fuel injector; and a controller operatively connected with the fuel injector and configured to actuate the fuel injector in a first stage injection event to introduce a pilot amount of the gaseous fuel through the pilot injection passageway into the space whereby the pilot amount auto-ignites; and to actuate the fuel injector in a second stage injection event to introduce a main amount of the gaseous fuel through the main injection passageway whereby the main amount ignites due to heat from combustion of the pilot amount, the second stage injection event occurring after the first stage injection event; a size of the pilot injection passageway is selected to control residency of the pilot amount in the space such that the pilot amount auto-ignites. In a preferred embodiment the fuel injector comprises a plurality of pilot injection passageways such that the pilot amount forms multiple pilot jets in the space, and gaseous fuel in each of the pilot jets auto-ignites. The gaseous fuel can be one of natural gas, methane, propane, ethane, biogas, landfill gas, hydrogen and mixtures of these fuels. The pilot injection passageway comprises a pilot cross-sectional area perpendicular to fuel flow therethrough, and the main injection passageway comprises a main cross-sectional area perpendicular to fuel flow therethrough, a ratio of the main cross-sectional area to the pilot cross-sectional area is within a range of 4 to 49, and more preferably the ratio is within a range of 9 to 49, and most preferably it is within a range of 11.5 to 49. The fuel injector can comprise a first valve and a second valve. The first valve is opened and the second valve is closed during the first stage injection event. The first valve and the second valve are opened during the second stage injection event. In a preferred embodiment the first valve and the second valve are biased in a closed position. During the first stage injection event the second valve while closed can leak any amount of the gaseous fuel that does not prevent the pilot amount from igniting. This simplifies the design and reduces the manufacturing costs for the second valve. In a preferred embodiment the fuel injector comprises a valve body and a valve needle assembly that reciprocates within the valve body. The valve body comprises first and second inside surfaces and the valve needle assembly comprises first and second outside surfaces. The first valve is formed between the first inside surface and the first outside surface. The second valve is formed between the second inside surface and the second outside surface. The pilot injection passageway extends from the downstream side of the first valve and the main injection passageway extends from a side of the second valve downstream from the first valve. The fuel injector further comprises an actuator and the controller is further configured to actuate the actuator to lift the valve needle assembly in the first stage injection event such that the gaseous fuel flows through the first valve to the pilot injection passageway. The controller is further configured to actuate the actuator to lift the valve needle assembly in the second stage injection event such that the gaseous fuel flows through the first valve to the pilot injection passageway and flows through the second valve to the main injection passageway. In one embodiment the valve needle assembly comprises a valve needle that comprises the first and second outside surfaces. In another embodiment the valve needle assembly comprises first and second valve needles. The first valve needle is cylindrically hollow and is disposed to reciprocate within the valve body, and the second valve needle is disposed to reciprocate within the first valve needle. The first valve needle comprises the first outside surface, the second valve needle comprises the second outside surface. The first valve needle further comprises a first annular surface and the second valve needle further comprises a second annular surface such that a gap exists between the first and second annular surfaces when the second valve is closed. The first annular surface closes the gap and lifts the second annular surface when the second valve is opened. The heat source can comprise a heating coil and the controller is further configured to actuate the heating coil to heat. The heat source can comprise an induction heater and the controller is further configured to actuate the induction heater to heat. The apparatus can further comprise a sparking mechanism operatively connected with the controller for igniting the gaseous fuel, and the controller is further configured to actuate the sparking mechanism. In another preferred embodiment the controller is further configured to actuate the fuel injector to introduce a second pilot amount of the gaseous fuel through the pilot injection passageway before the first stage injection event; and to actuate the sparking mechanism to spark ignite the second pilot amount of the gaseous fuel; such that the heat source comprises heat from combustion of the second pilot amount of the gaseous fuel. Introduction of the second pilot amount forms a second pilot jet, and the apparatus further comprises a diverting member operable to divert flow of the second pilot jet such that residency and mixing of the second pilot jet in the space is increased and air flow velocity of the second pilot jet is decreased thereby creating improved conditions for spark ignition. The diverting member can also be employed to divert the pilot jet introduced during the first stage injection event to increase and improve residency. In yet another embodiment, the second stage injection event can occur before the first stage injection event instead of after, such that the main amount of the gaseous fuel is introduced before the pilot amount of the gaseous fuel. This allows the main fuel to premix before ignition. The apparatus can further comprise a second fuel injector for introducing a second fuel directly into the combustion chamber, and the controller is further configured to actuate the second fuel injector. The second fuel can be at least one of hydrogen and diesel. The apparatus can further comprise a heat absorbent material for absorbing heat from the heat source and for transferring the heat to the space.

An improved apparatus for igniting a gaseous fuel in a combustion chamber of an internal combustion engine comprises a first fuel injector for directly introducing the gaseous fuel into the combustion chamber, the first fuel injector comprises a pilot injection passageway; an intake valve upstream from the combustion chamber; a second fuel injector for introducing the gaseous fuel upstream from the intake valve; a heat source near the fuel injector; and a controller operatively connected with the first and second fuel injectors and configured to actuate the second fuel injector to introduce a main amount of the gaseous fuel whereby the main amount forms a premixed mixture in the combustion chamber; and to actuate the first fuel injector to introduce a pilot amount of the gaseous fuel through the pilot injection passageway into the space whereby the pilot amount auto-ignites and heat from combustion of the pilot amount ignites the main amount; a size of the pilot injection passageway is selected to control residency of the pilot amount in the space such that the pilot amount auto-ignites. The apparatus can further comprise a heat absorbent material for absorbing heat from the heat source and for transferring the heat to the space.

An improved method of igniting a gaseous fuel directly introduced into a combustion chamber of an internal combustion engine comprising forming a homogenous ignition environment in the combustion chamber for ignition of a main amount of the gaseous fuel comprising:

heating a space around a fuel injector nozzle; and one of:
(1) injecting a pilot amount of the gaseous fuel into the combustion chamber during a first stage injection event through a plurality of pilot jets equally spaced around a fuel injector nozzle within a predetermined range of tolerance; and
igniting the pilot amount by controlling residency of the pilot jets in the space such that a temperature of the pilot jets increases to an auto-ignition temperature of the gaseous fuel whereby each pilot jet ignites independently; and
(2) injecting the pilot amount during the first stage injection event through at least one pilot jet into the combustion chamber;
diverting and retaining the at least one pilot jet such that the pilot amount envelopes a surface around the fuel injector nozzle; and
igniting the pilot amount by one of heat from the space and a sparking mechanism; and
introducing the main amount during a second stage injection event into the homogenous ignition environment; and igniting the main amount through heat from combustion of the pilot amount.

An improved fuel injecting apparatus for directly introducing and igniting a gaseous fuel in a combustion chamber of an internal combustion engine comprising a fuel injector comprising a nozzle and a plurality of main injection passageways around the nozzle for injecting a main amount of the gaseous fuel, the fuel injector adapted to form a homogenous ignition environment in the combustion chamber for ignition of the main amount by introducing and igniting a pilot amount of the gaseous fuel, the adaptation comprising:
a heated surface extending annularly around the nozzle of the fuel injector; and one of:
(1) a plurality of pilot injection passageways in the nozzle for injecting the pilot amount by way of a plurality of pilot jets, the pilot injection passageways spaced equally around the nozzle within a predetermined range of tolerance, the pilot injection passageways sized such that residency of the pilot jets is controlled near the heated surface whereby each pilot jet reaches an auto-ignition temperature and ignites independently of other the pilot jets; and
(2) at least one pilot injection passageway in the nozzle for injecting the pilot amount and forming at least one pilot jet, a diverting and retaining member extending annularly around the heated surface, whereby the at least one pilot jet impacts the diverting and retaining member such that the pilot amount of gaseous fuel envelopes the heated surface around the nozzle, and an ignition source for the pilot amount;
and a controller programmed to actuate the fuel injector in a first stage injection event to introduce the pilot amount of the gaseous fuel into the combustion chamber; and actuate the fuel injector in a second stage injection event to introduce the main amount of the gaseous fuel whereby the main amount ignites due to heat from combustion of the pilot amount. The ignition source can comprise a sparking mechanism operatively connected with the controller for igniting the gaseous fuel, whereby the controller is further programmed to actuate the sparking mechanism. Alternatively, the ignition source can comprise heat from the heated surface that elevates the temperature of the pilot amount to its auto-ignition temperature.

An improved fuel injecting apparatus for directly introducing and igniting a gaseous fuel in a combustion chamber of an internal combustion engine comprising an intake valve for introducing a charge into the combustion chamber; a first fuel injector for injecting a main amount of the gaseous fuel upstream from the intake valve; a second fuel injector adapted to form a homogenous ignition environment in the combustion chamber for ignition of the main amount by directly introducing and igniting a pilot amount of the gaseous fuel, the adaptation comprising:

a heated surface extending annularly around a nozzle of the second fuel injector; and one of:

(1) a plurality of pilot injection passageways in the nozzle for injecting the pilot amount by way of a plurality of pilot jets, the pilot injection passageways spaced equally around the nozzle within a predetermined range of tolerance, the pilot injection passageways sized such that residency of the pilot jets is controlled near the heated surface whereby each the pilot jet reaches an auto-ignition temperature and ignites independently of other pilot jets; and (2) at least one pilot injection passageway in the nozzle for injecting the pilot amount and forming at least one pilot jet, a diverting and retaining member extending annularly around the heated surface, whereby the at least one pilot jet impacts the diverting and retaining member such that the pilot amount of gaseous fuel envelopes the heated surface around the nozzle, and an ignition source for the pilot amount.

The ignition source can comprise a sparking mechanism operatively connected with the controller for igniting the gaseous fuel, whereby the controller is further programmed to actuate the sparking mechanism.

BRIEF DESCRIPTION OF THE DRAWINGS

FIG. 3a is a partial schematic view of the fuel injector of FIG. 1 shown in the closed position during the beginning of a compression stroke of the internal combustion engine.

FIG. 3b is a partial schematic view of the fuel injector of FIG. 1 shown in the first open position later in the compression stroke then the view of FIG. 3a.

FIG. 3c is a partial schematic view of the fuel injector of FIG. 1 shown in the first open position later in the compression stroke then the view of FIG. 3b.

FIG. 3d is a partial schematic view of the fuel injector of FIG. 1 shown in the closed position later in the compression stroke then the view of FIG. 3c.

FIG. 3e is a partial schematic view of the fuel injector of FIG. 1 shown in the second open position later in the compression stroke then the view of FIG. 3d.

FIG. 3f is a partial schematic view of the fuel injector of FIG. 1 shown in the second open position later in the compression stroke then the view of FIG. 3e.

FIG. 11a is a partial schematic view of the fuel injector of FIG. 10a shown in the closed position during the beginning of a compression stroke of the internal combustion engine.

FIG. 11b is a partial schematic view of the fuel injector of FIG. 10b shown in the first open position later in the compression stroke then the view of FIG. 11a.

FIG. 11c is a partial schematic view of the fuel injector of FIG. 10b shown in the first open position later in the compression stroke then the view of FIG. 11b.

FIG. 11d is a partial schematic view of the fuel injector of FIG. 10a shown in the closed position later in the compression stroke then the view of FIG. 11c.

FIG. 11e is a partial schematic view of the fuel injector of FIG. 10c shown in the second open position later in the compression stroke then the view of FIG. 11d.

FIG. 11f is a partial schematic view of the fuel injector of FIG. 10c shown in the second open position later in the compression stroke then the view of FIG. 11e.

FIG. 13 is a tabular view of simulated ignition results for three computational flow dynamic (CFD) models of an internal combustion engine employing various ignition strategies. The column labelled "Engine Operating Conditions" specifies the operating mode for the engine during the simulation. The column labelled "Case" refers to the specific row in the results for identification purposes. The column labelled "Model" specifies which CFD model for ignition was employed. The column labelled "Heated Surface Temperature" specifies either the temperature of heated surface 510 or the timing for spark assisted ignition. The column labelled "Pilot Flow Rate" specifies flow rate of gaseous fuel through corresponding fuel injectors for pilot injections of gaseous fuel. The column labelled "Pilot1-SOI" specifies start of injection timing for a first pilot injection event. The column labelled "Pilot1 Quantity" specifies the quantity of gaseous fuel injected during the first pilot injection event. The column labelled "Pilot2-SOI" specifies start of injection timing for a second pilot injection event. The column labelled "Pilot2 Quantity" specifies the quantity of gaseous fuel injected during the second pilot injection event. The column labelled "Ignition" specifies whether ignition of a main quantity of gaseous fuel injected during a main injection event was successful.

DETAILED DESCRIPTION OF PREFERRED EMBODIMENT(S)

Figure 1:
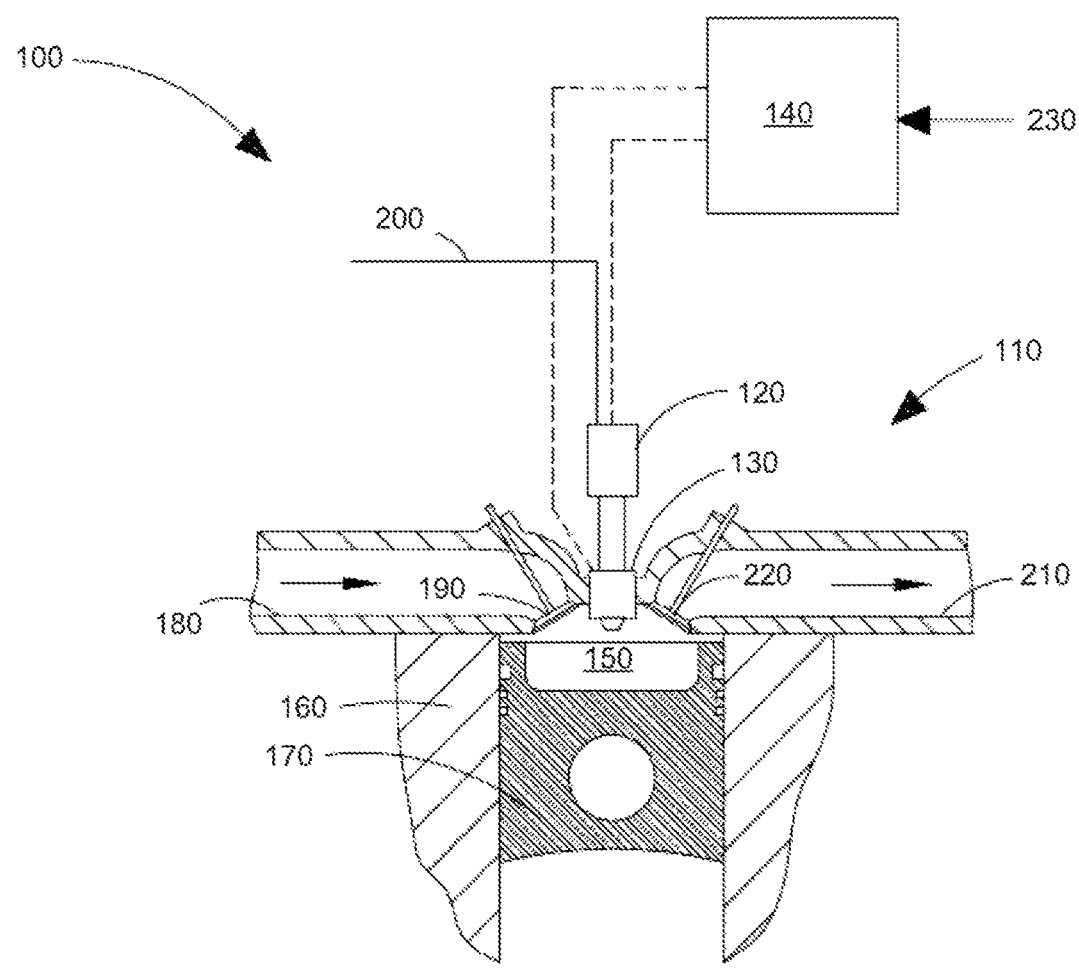
FIG. 1 is a partial schematic view of a fuel injector and an ignition source in an internal combustion engine according to a first embodiment.

Referring to the schematic view of FIG. 1, there is shown an apparatus 100 for combusting a gaseous fuel in an internal combustion engine, the manner by which will now be described. The gaseous fuel in the present embodiment is natural gas, and in other preferred embodiments can be methane, propane, ethane, biogas, landfill gas, hydrogen and mixtures of these fuels. Apparatus 100 comprises engine 110, fuel injector 120, ignition source 130 and electronic controller 140. Only a cross-section of engine 110 showing the combustion chamber of one engine cylinder is shown but those skilled in the technology will understand that the engine comprises other components and typically a plurality of cylinders. Engine 110 can be for a vehicle, and can also be employed in marine, locomotive, mine haul, power generation or stationary applications. The flow of air into combustion chamber 150 from intake air manifold 180 is controlled by intake valve 190, which can be opened during intake strokes of piston 170. Fuel injector 120 receives the gaseous fuel from supply conduit 200 and introduces the gaseous fuel directly into combustion chamber 150, which is generally defined by a bore provided in cylinder block 160, the cylinder head, and piston 170, which is movable up and down within the bore. In the present illustrative example the fuel-air mixture is ignited with the assistance of ignition source 130 in combustion chamber 150. Combustion products are expelled from combustion chamber 150 into exhaust manifold 210 through exhaust valve 220, which is opened during exhaust strokes of piston 170. Controller 140 is configurable and programmable to selectively command the timing for opening and closing of a valve member in fuel injector 120 that respectively controls the injection of the gaseous fuel into combustion chamber 150. Similarly, controller 140 commands ignition source 130 to selectively assist with ignition of the gaseous fuel in combustion chamber 150. In the present example controller 140 is a an electronic controller such as a computer comprising a processor and memories, including a permanent memory, such as FLASH or EEPROM, and a temporary memory, such as SRAM or DRAM, for storing and executing a program. In another preferred embodiment controller 140 is an engine control unit (ECU) of engine 110. The fuel injection and ignition timing can be predetermined responsive to engine operating conditions determined from measured parameters that are inputted into electronic controller 140, and the input of such parameters is represented by arrow 230.

Figure 2A:
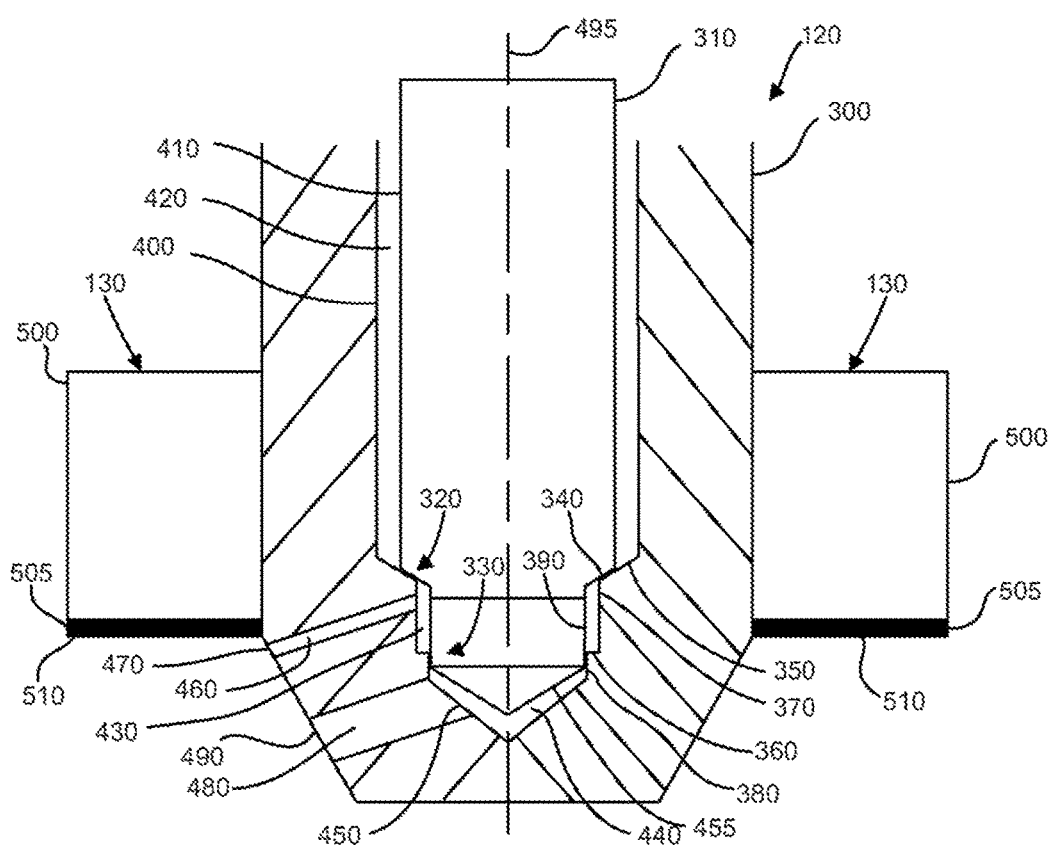
FIGS. 2a, 2b and 2c are partial schematic views of the fuel injector of FIG. 1 shown in a closed position, a first open position and a second open position respectively.
Figures 2B, 2C:
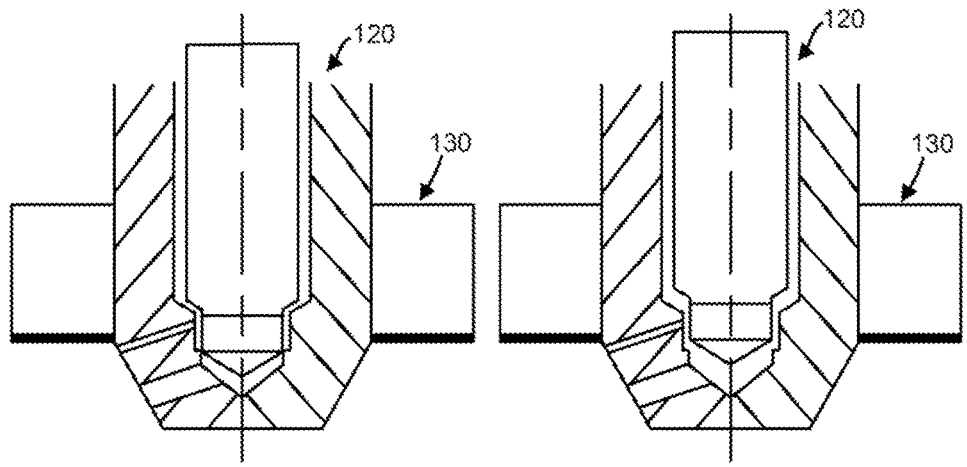

Referring now to FIG. 2a there is shown a partial cross-sectional view of a first illustrative embodiment of fuel injector 120 and ignition source 130. Fuel injector 120 comprises a cylindrically hollow valve body 300, also known as a nozzle, which is concentric with cylindrical valve needle 310. Valve body 300 in cooperation with valve needle 310 form two annular valves 320 and 330 which extend around an inner surface of body 300 and an outer surface of needle 310. Valve needle 310 reciprocates between a closed position, as shown in FIG. 2a, a first open position where valve 320 is open and valve 330 is closed, as shown in FIG. 2b, and a second open position where both valves 320 and 330 are open as shown in FIG. 2c. An actuator (not shown) actuates valve needle 310 to move between the closed position and the first and second open positions by employing conventional actuation elements. For example, the actuator can be a solenoid-type actuator or a strain-type actuator employing either magnetostrictive, electrostrictive, or piezoelectric elements. Additionally, the actuator can act directly or indirectly on valve needle 310. Valve 320 comprises tapered shoulder 340 on valve needle 310, which forms a mutually congruent, match fit with tapered shoulder 350 on valve body 300. Fuel passageway 420 extends longitudinally between inner surface 400 of valve body 300 and outer surface 410 of valve needle 310 into valve 320 at one end and at the other end connects with a supply of gaseous fuel (not shown). Fuel passageway 430 begins at a side of valve 320 opposite passageway 420 and extends between body 300 and needle 310 to step 360 at valve 330. Step 360 extends between inner surface 370 and inner surface 380 of valve body 300 and separates valve 320 from valve 330 allowing valve 320 to be opened before valve 330 can open. Valve 330 comprises inner surface 380 which forms a match fit with outer surface 390 on valve needle 310. Fuel passageway 440 extends between surface 450 of body 300 and surface 455 of needle 310 from valve 330 to a bottom of the inner surface of body 300. Pilot injection passageway 460 extends from passageway 430 to pilot injection orifice 470 through an outer surface of body 300. Main injection passageway 480 extends from passageway 440 to main injection orifice 490 through the outer surface of body 300. Only one such pilot injection passageway 460 and main injection passageway 480 are illustrated in the figures, but as would be understood by those familiar with the technology there are preferably further such passageways extending between the inside surface and the outside surface of body 300. For example, in preferred embodiments there are at least six pilot injection passageways 460 and preferably there are between eight and twelve pilot injection passageways. The number of main injection passageways 480 can equal the number of pilot injection passageways 460, however this is not a requirement.

Ignition source 130 comprises heating element 500 and heat absorbent layer 505, which extend annularly around valve body 300. Heating element 500 is a source of heat, and in the present embodiment element 500 comprises a heating coil that transforms electrical energy to thermal energy, due to its electrical resistance, when an electric current is passed through. In other embodiments element 500 can be an induction heater. Ignition source 130 can comprise Kathanal wire. Layer 505 comprises a heat absorbent material, such as a ceramic material, and acts to absorb heat from heating element 500 and to transfer heat through heated surface 510 by convection, conduction and/or radiation to a space near fuel injector 120 in combustion chamber 150. Layer 505 and surface 510 further serve to provide a more uniform temperature gradient around the nozzle of injector 120. There are other sources of thermal energy in engine 110 that heat surface 510 and the nearby space. Heat resulting from compression of air and combustion of pilot injections of gaseous fuel increase the air temperature in chamber 150. Depending upon the temperature of layer 505 and surface 510 both compression and combustion heat can be absorbed or transferred to surface 510. Heated surface 510 assists with ignition of gaseous fuel from pilot injection passageway 460 and also from main injection passageway 480, as will be described in more detail below, by elevating the temperature of the gaseous fuel towards its auto-ignition temperature.

With reference to FIGS. 2 and 3, the operation of fuel injector 120 and ignition source 130 in engine 110 will now be described. As the compression stroke of piston 170 begins both valves 320 and 330 are closed and fuel from passageway 420 is prevented from flowing through pilot injection passageway 460 and main injection passageway 480, as illustrated in FIG. 3*a*. As piston 170 continues into the compression stroke a first stage injection event occurs preferably within the range of 50° before top dead center (BTDC) to 0° BTDC, as will be explained in more detail below. Electronic controller 140 commands the actuator to lift needle 310 to the first open position where valve 320 is open and valve 330 is substantially closed, as shown in FIGS. 3*b* and 3*c*. Gaseous fuel from passageway 420 flows through valve 320 into passageways 430 and 460, and then into combustion chamber 150 through orifice 470 forming pilot jet 520 that flows in the space near heated surface 510. As used herein pilot fuel refers to the gaseous fuel injected through passageway 460 and forming pilot jet 520. The volumetric flow rate of pilot jet 520 is controlled such that the penetration distance and residency of jet 520 near heated surface 510 allows at least a portion of the fuel in jet 520 to reach its auto-ignition temperature, which may happen when or after jet 520 impacts surface 510 although this is not a requirement. Residency refers to the time pilot fuel remains in the space near heated surface 510 such that its temperature can be increased at a sufficient rate for auto-ignition to occur before the pilot fuel becomes too lean to ignite successfully. The temperature gradient near surface 510 is preferably sufficient relative to the trajectory and velocity of jet 520 to ignite the fuel before it impacts surface 510 such that combustion is not adversely affected by excessive carbon deposit build-up on surface 510. Surface 510 can reach temperatures where adherence of combustion products and contaminants thereto will be reduced sufficiently, in which case ignition on or after impact does not degrade ignition performance. The equivalence ratio of the fuel-air mixture at the time of auto-ignition of jet 520 is high enough (not overly lean) to allow a pilot flame to propagate such that combustion of fuel from the pilot injection proceeds.

Figure 4:
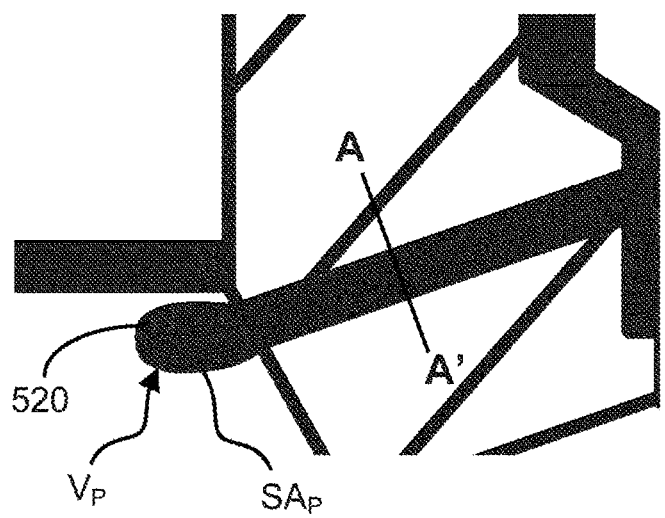
FIG. 4 is a partial schematic view of the fuel injector of FIG. 1 illustrating a surface area and volume of a pilot jet of gaseous fuel emerging from a pilot injection orifice.

The volumetric flow rate of pilot jet 520 allows sufficient residency of jet 520 around surface 510 such that it reaches its auto-ignition temperature. It has been determined that for typical fuel injection pressures when passageway 460 is too large in cross-section jet 520 does not have sufficient residency under surface 510 to reach its auto-ignition temperature. As shown in FIG. 4, when pilot jet 520 emerges from orifice 470 it has a surface area $SA_P$ and a volume $V_P$ that are substantially determined by the cross-sectional area of passageway 460 taken along line A-A' perpendicular to the flow of fuel. The cross-sectional area is predetermined according to which an instantaneous ratio of surface area $SA_P$ to volume $V_P$ causes sufficient entrainment of air by jet 520 to retard its progress near surface 510 such that it heats up to its auto-ignition temperature before the fuel-air mixture becomes overly lean. In general, jet 520 entrains more air as surface area $SA_P$ increases, which tends to slow the progress of jet 520, and the momentum of jet 520 increases as volume $V_P$ increases, which tends to maintain the forward progress of jet 520. Therefore, the cross-sectional area of passageway 460 must be selected to balance entrainment of air versus momentum of jet 520 in order to auto-ignite the fuel for a given temperature gradient under surface 510 and for a given fuel injection pressure. When balanced correctly, jet 520 achieves an appropriate equivalence ratio near heated surface 510 at the point of auto-ignition. In a preferred embodiment, the cross-section of passageway 460 is circular, for example when passageway 460 is formed by drilling a circular bore. In this situation when jet 520 first emerges from orifice 470 outer surface area $SA_P$ is directly proportional to a product of diameter $d_P$ of passageway 460 and penetration distance $l_P$ of jet 520 into chamber 150, according to Eq. 1 below, and volume $V_P$ is directly proportional to a product of the square of the diameter $d_P$ and the penetration distance $l_P$, according to Eq. 2 below. The ratio of surface area $SA_P$ to volume $V_P$ is shown in Eq. 3.

$$SA_P \propto \pi * d_P * l_P \qquad \text{Eq. 1}$$

$$V_P \propto \frac{\pi}{4} * d_P^2 * l_P \qquad \text{Eq. 2}$$

$$\frac{SA_P}{V_P} \propto \frac{4}{d_P} \qquad \text{Eq. 3}$$

As can be seen by Eq. 3 the smaller the diameter $d_P$ the greater the ratio of $SA_P$ over $V_P$. It would be understood by those familiar with the technology that the further jet 520 penetrates into chamber 150 the relationships above become less accurate due to dispersion and mixing of jet 520, however the general principle remains valid.

The flow of gaseous fuel through main injection passageway 480 is constrained by valve 330 which is closed while injector 120 is in the first open position. It is possible to allow some fuel to leak through valve 330 when closed and subsequently into main injection passageway 480 without significantly degrading combustion performance of the present embodiment. It is sufficient to provide a close match fit between surfaces 380 and 390, as seen in FIG. 2a, instead of a sealed engagement between these surfaces. This reduces the complexity of valve 330 which correspondingly reduces the manufacturing cost of the present arrangement. The amount of leakage that is tolerable depends upon the overall design of engine 110, but the main requirement is that the pilot fuel from passageway 460 auto-ignites. Another motivating factor in controlling leakage relates to unburned hydrocarbon (UHC) emission. It has been shown that UHC emission can be reduced significantly if at the time of the first stage injection event the flow of gaseous fuel through main injection passageway 480 can be constrained. This reduces the potential for forming a large amount of fuel-air mixture with very low equivalence ratio, which often results in higher UHC emission. After the first stage injection event is completed electronic controller 140 commands the actuator to close needle 310 such that valves 320 and 330 are both closed, as illustrated in FIG. 3d, and fuel from passageway 420 no longer flows into passageway 460. Closing valves 320 and 330 allows pilot jet 520 to heat up before further gaseous fuel is injected. When valve 320 is closed tapered shoulder 340 on needle 310 forms a sealed engagement with tapered shoulder 350 on body 300 such that very little fuel, and preferably none, is leaked.

Figure 5:
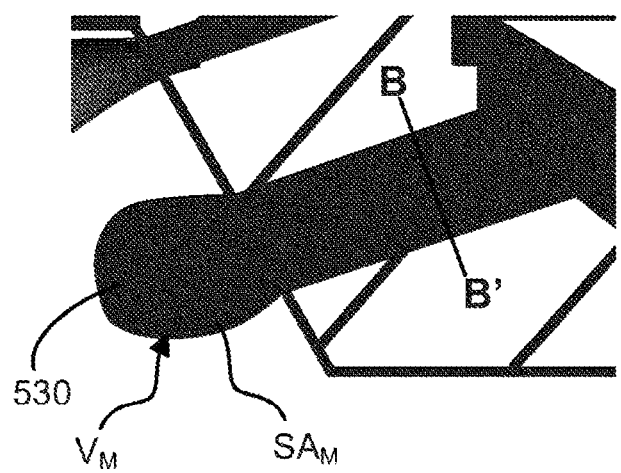
FIG. 5 is a partial schematic view of the fuel injector of FIG. 1 illustrating a surface area and volume of a main jet of gaseous fuel emerging from a main injection orifice.

After a predetermined time in the closed position of FIG. 3d electronic controller 140 commands the actuator in a second stage injection event to lift needle 310 from the closed position to the second open position as illustrated in FIG. 3e, where both valves 320 and 330 are open. Gaseous fuel flows through both pilot injection passageway 460 and main injection passageway 480 and out of orifices 470 and 490 respectively. Main jet 530 is formed from gaseous fuel leaving orifice 490. As used herein main fuel refers to the gaseous fuel injected through passageway 480 forming main jet 530. The volumetric flow rate of main jet 530 is dependent upon fuel injection pressure and the size of passageway 480. Accordingly, passageway 480 is sized to meet the maximum volumetric flow rate requirement under full load operating conditions of engine 110. Due to the size of passageway 480, main jet 530 has a short residency near surface 510 for all operating conditions. Surface area $SA_M$ of jet 530, as shown in FIG. 5, is insufficient to entrain enough air to slow down the momentum of volume $V_M$ of jet 530, and in the absence of combustion of the pilot fuel the main fuel is prevented from reaching its auto-ignition temperature. In contrast to pilot jet 520, the ratio of surface area $SA_P$ to volume $V_P$ of jet 520 is greater than the ratio of surface area $SA_M$ to volume $V_M$ of jet 530. Main jet 530 penetrates further into the combustion chamber 150 than pilot jet 520 and achieves good mixing. The combustion of the pilot fuel introduced during the first stage injection event forces the ignition of the main fuel as illustrated in FIG. 3f. It is preferred that the pilot fuel auto-ignites before the second stage injection event since the introduction of the main fuel into combustion chamber 150 cools the pilot fuel and heated surface 510, and in this situation it would require even more thermal energy from heating element 500 to heat the pilot fuel to its auto-ignition temperature. This puts more stress on the components leading to reduced operating life.

In other embodiments it is possible to proceed from the first open position after the first stage injection event, as seen in FIG. 3c, directly to the second open position as seen in FIG. 3e, without the middle step of returning to the closed position as seen in FIG. 3d. This is advantageous when the fuel injection pressure is low, which reduces the volumetric and mass flow rates, since it allows more time for gaseous fuel to be introduced into combustion chamber 150 through passageway 480 and more time for the main fuel to mix before combustion. In this situation electronic controller 140 commands the actuator during the second stage injection event to further lift needle 310 from the first open position (FIG. 3c) to the second open position (FIG. 3e) such that both valves 320 and 330 are open. In some engine operating conditions, such as idle, it can be sufficient to perform only pilot injections since the amount of pilot fuel introduced is sufficient in this part of the engine map.

Returning to the timing of the first stage injection event, this is related to the timing of the second stage injection event. If the pilot fuel in jet 520 is injected and ignited too early then heat from the combustion of the pilot fuel can dissipate such that it can not ignite the main fuel. If the pilot fuel in jet 520 is injected early and then ignited closer to the second stage injection event then it can become overly lean in which case the pilot flame will not propagate and ignition of the main fuel will fail. The timing of the first stage injection event and ignition of the pilot fuel should be such that the pilot fuel is not too rich (high equivalence) at the time ignition occurs to prevent soot formation (the pilot fuel does require some leaning before ignition). As the timing of the first stage injection event occurs later into the compression stroke a greater air temperature is required to heat the pilot fuel in a shorter period of time for auto-ignition to occur before the main fuel is injected. The timing of the first stage injection event is dependent on the timing of the second stage injection event and on the temperature of heated surface 510. The main requirement is that the pilot fuel ignites and combustion of the pilot fuel assists with the ignition of the main fuel.

A further consideration in sizing pilot injection passageway 460 is the mass of gaseous fuel delivered through passageway 460 should not be more than approximately 20% of total gaseous fuel mass delivered. The amount of pilot fuel introduced into combustion chamber 150 is within a range of 2% to 20% of total gaseous fuel introduced, and preferably it is within a range of 2% to 10%, and more preferably it is within a range of 2% and 8%. The amount of pilot fuel consumed is preferably 5% of total gaseous fuel introduced, and the ratio of main fuel to pilot fuel introduced is preferably 19. It has been found that both the mass flow requirements and the air entrainment requirements for both jets 520 and 530 are met when the ratio of the cross-sectional area of main injection passageway 480 to the cross-sectional area of pilot injection passageway 460 is within a range of 4 to 49, and more preferably it is within a range of 9 to 49, and most preferably it is within a range of 11.5 to 49. These cross-sectional area ratios are applicable when the pilot injection passageway 460 is the limiting geometry downstream from valve 320 that determines the mass flow rate of pilot fuel, and main injection passageway 480 is the limiting geometry downstream from valve 330 that determines the mass flow rate of main fuel. In other embodiments, there may not be an equal number of pilot injection passageways 460 and main injection passageways 480. In this situation the total amount of pilot fuel introduced as a percentage of total gaseous fuel introduced is the same as above, and the ratio of total cross-sectional area of passageways 480 to total cross-sectional area of passageways 460 is within the ranges above.

Figure 6:
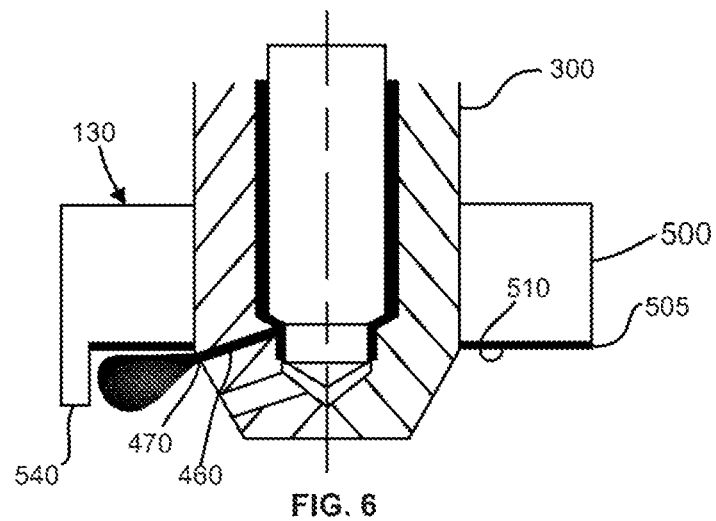
FIG. 6 is a partial schematic view of a fuel injector and an ignition source according to a second embodiment.

Referring now to the schematic view of FIG. 6, there is shown a second embodiment which is similar to the previous embodiment and like parts have like reference numerals and are not described in detail, if at all. Ignition source 130 includes diverting and retaining member 540 that extends partially around an outer periphery of ignition source 130 on either side of orifice 470. When valve body 300 comprises multiple pilot injection orifices 470, then each such orifice 470 has a respective diverting and retaining member 540. During injection of the pilot fuel through passageway 460, pilot jet 520 impacts diverting member 540 which diverts the flow around the perimeter of valve body 300 in both directions increasing residence time by retaining pilot fuel near heated surface 510. The impact causes turbulence in jet 520 which improves mixing of pilot fuel without it becoming overly lean. Since residence time is increased by member 540, the pilot fuel has more time to heat to its auto-ignition temperature and therefore the load on heating element 500 can be reduced which extends the operating life of ignition source 130. Also, due to increased residence time a fewer number of larger cross-sectional area pilot injection passageways 460 with corresponding higher volume and mass flow rates for a given injection pressure can be employed. This provides a manufacturing advantage since these larger passageways are easier to manufacture.

Figure 7:
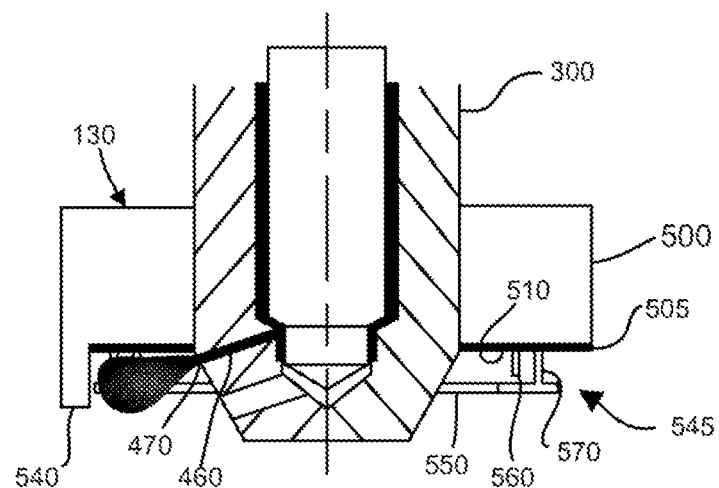
FIG. 7 is a partial schematic view of a fuel injector and an ignition source according to a third embodiment.
Figure 8:
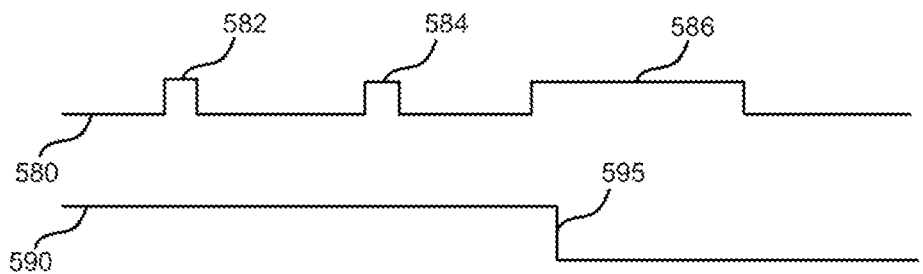
FIG. 8 is a diagram of an injector actuation waveform and a heating element activation waveform for the fuel injector and the ignition source respectively of FIG. 7.

Referring now to the schematic view of FIG. 7, there is shown a third embodiment which is similar to the previous embodiments and like parts have like reference numerals and are not described in detail, if at all. Sparking mechanism 545 ignites gaseous fuel by spark ignition and comprises spark ring 550 and source electrodes 560. Spark ring 550 is a ground electrode and extends around a perimeter of valve body 300 and is secured to ignition source by post 570. Source electrodes 560 are spaced along the path of ring 550 and are a source of electrical energy for which ring 550 is a return path to ground for sparks that occur when a sufficient voltage differential exists between electrodes 560 and ring 550. In a preferred embodiment there is at least one electrode between respective pairs of pilot injection orifices 470 around valve body 300, for which only one such passageway is shown in FIG. 7, although this is not a requirement. During injection of the pilot fuel through passageway 460, pilot jet 520 is shown to impact diverting member 540 which diverts the flow around the perimeter of valve body 300 in both directions increasing residence time by retaining pilot fuel near heated surface 510. In other embodiments sparking mechanism can be employed without the use of diverting and retaining member 540. Depending upon engine operating conditions the pilot fuel can either be ignited due to heat from surface 510, or ignited due to sparking mechanism 545. When spark ignited, surface 510 improves the ignitability of the pilot fuel introduced by heating it to a temperature that is less than the auto-ignition temperature. Under control of electronic controller 140 sparking mechanism 545 ignites the pilot fuel a predetermined amount of time after injection. The operating life of ignition source 130 can be extended by employing the different ignition methods, that is auto-ignition due to heated surface 510 and spark ignition, at different engine operating conditions. To reduce electric erosion of electrodes 560 and spark ring 550, spark ignition can be employed during conditions of low in-cylinder pressure, such as at light load or at an early stage of the compression stroke. Heat from combustion of earlier-in-cycle injected pilot fuel and compression of the piston can be retained by heated surface 510 to assist with ignition of later-in-cycle injected pilot fuel. In this operating mode heating element 500 can operate at a reduced power level or is not required if enough heat can be retained by surface 510 to ignite the later-in-cycle pilot fuel injection. The current that is exciting heating element 500 can be reduced after combustion of the earlier-in-cycle injected pilot fuel such that its operating life is increased. Referring now to FIG. 8, a timing diagram for a three stage injection of gaseous fuel is illustrated. Actuation waveform 580 controls fuel injector 120, and excitation waveform 590 controls heating element 500. First pilot pulse 582 actuates a first pilot injection of gaseous fuel that is spark ignited by sparking mechanism 545. The first pilot injection of gaseous fuel is given enough time to mix with air and to achieve relatively low air flow velocity for robust spark ignition. Diverting member 540 assists with decreasing air flow velocity of jet 520. The combustion heat resulting from the first pilot injection of gaseous fuel elevates the temperature of air in combustion chamber 150 and heated surface 510. Later in the compression stroke a second pilot pulse 584 actuates a second pilot injection of gaseous fuel that auto-ignites as previously discussed due to heat from the earlier combustion of pilot fuel injected by first pilot pulse 582 and from heating element 500 if required. Main pulse 586 actuates a main injection of gaseous fuel which is ignited due to heat from combustion of the pilot fuel due to second pilot pulse 584. After main pulse 586 the excitation current through heating element 500, when present, is turned off at falling edge 595.

In other embodiments of the present technique, the main fuel can be injected through passageway 480 before the pilot fuel is injected through passageway 460. This increases the mixing time of the main fuel such that the main fuel burns in a premixed combustion mode, which results in improved combustion with reduced emissions. The timing of the main injection relative to the pilot injection is such that the main fuel can thoroughly premix and the pilot fuel can be sufficiently heated by surface 510 to auto-ignite. If sparking mechanism 545 is employed then the load on heating element 500 can be reduced. In still further embodiments, the main fuel can be injected through a port fuel injector. In this embodiment fuel injector 120 does not require main injection passageway 480 and annular valve 330 and can be simplified accordingly. The main fuel injected through the port fuel injector burns in a premixed combustion mode.

Figure 9A:
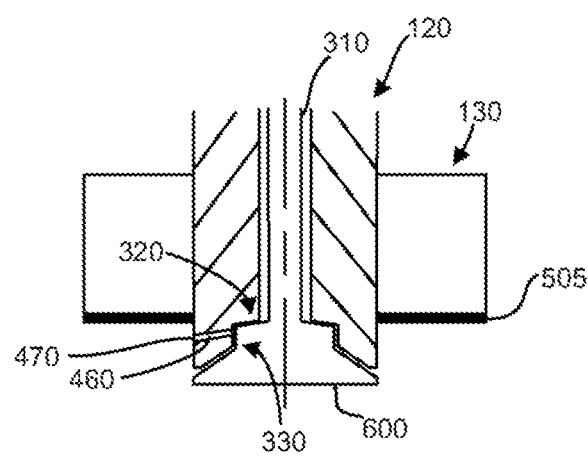
FIGS. 9a, 9b and 9c are partial schematic views of an ignition source and a fuel injector shown in a closed position, a first open position and a second open position respectively according to a fourth embodiment.
Figure 9B:
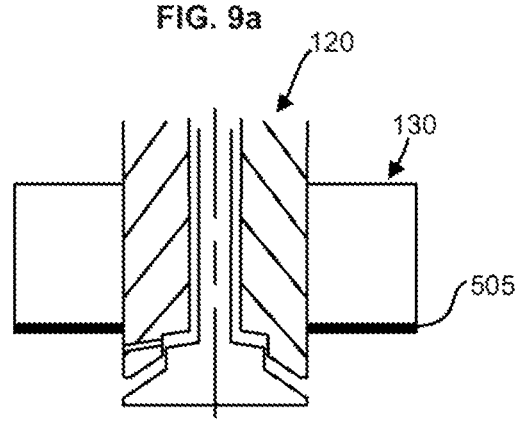
Figure 9C:
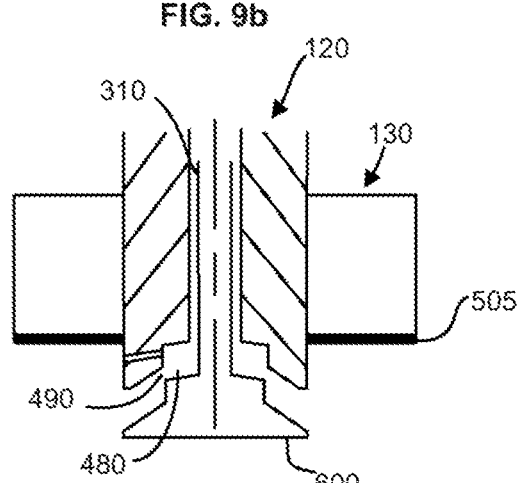

Referring now to the schematic view of FIGS. 9*a*, *b* and *c*, there is shown a fourth embodiment which is similar to the previous embodiments and like parts have like reference numerals and are not described in detail, if at all. Fuel injector 120 is an outward opening injector in this example, which is advantageous when the fuel injection pressure of the gaseous fuel is low. Injector 120 is in the closed position in FIG. 9a where both valves 320 and 330 are closed, the first open position in FIG. 9b where valve 320 is open and valve 330 is closed, and the second open position in FIG. 9c where both valves 320 and 330 are open. Valve 330 is a pintle-type valve which forms an annular main injection passageway 480 between valve closure member 600 at the end of needle 310 and body 300. The main fuel jet that emerges from passageway 480 is in the form of a conical sheet. When the conical sheet is not stable it requires ventilation to equalize pressure above and below the sheet. Diverting member 540 discussed above in relation to FIG. 6 would also be advantageous in the present embodiment, due to the low fuel injection pressure allowing adequate mixing of pilot fuel for which spark ignition would be suitable. The percentage of total pilot fuel introduced relative to total gaseous fuel introduced follows the relationship previously discussed.

Figure 10A:
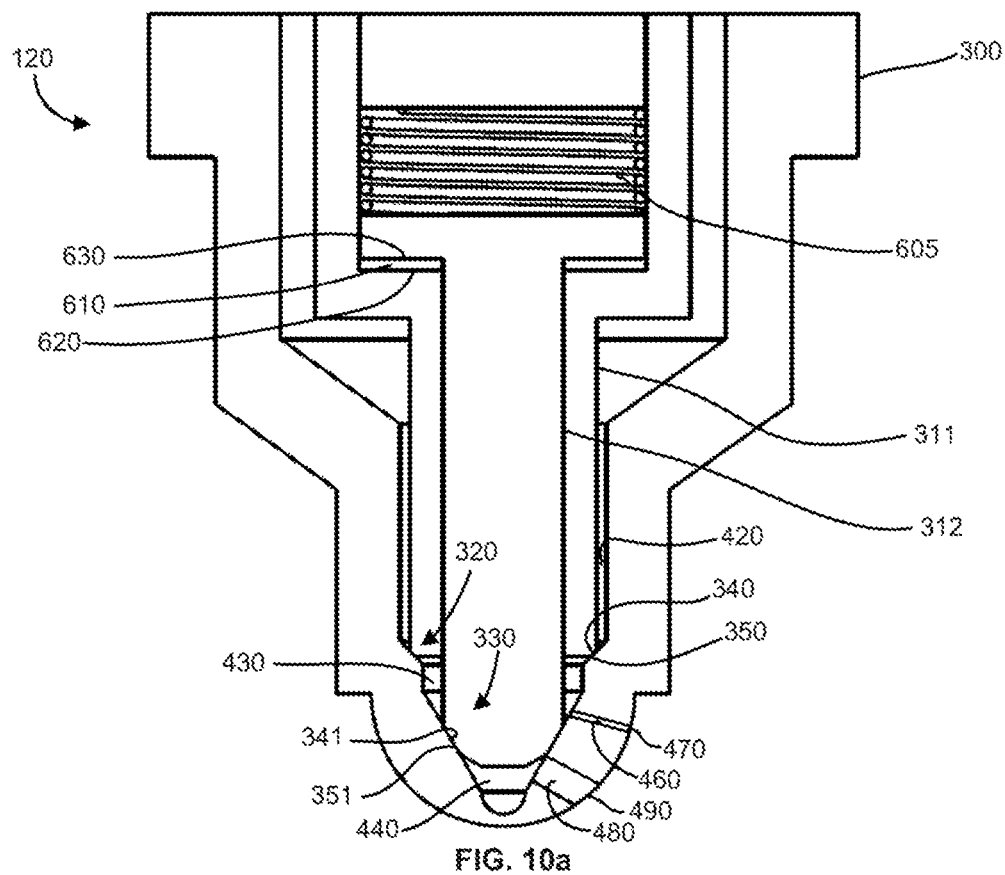
FIGS. 10a, 10b and 10c are partial schematic views of a fuel injector shown in a closed position, a first open position and a second open position according to a fifth embodiment.
Figures 10B, 10C:
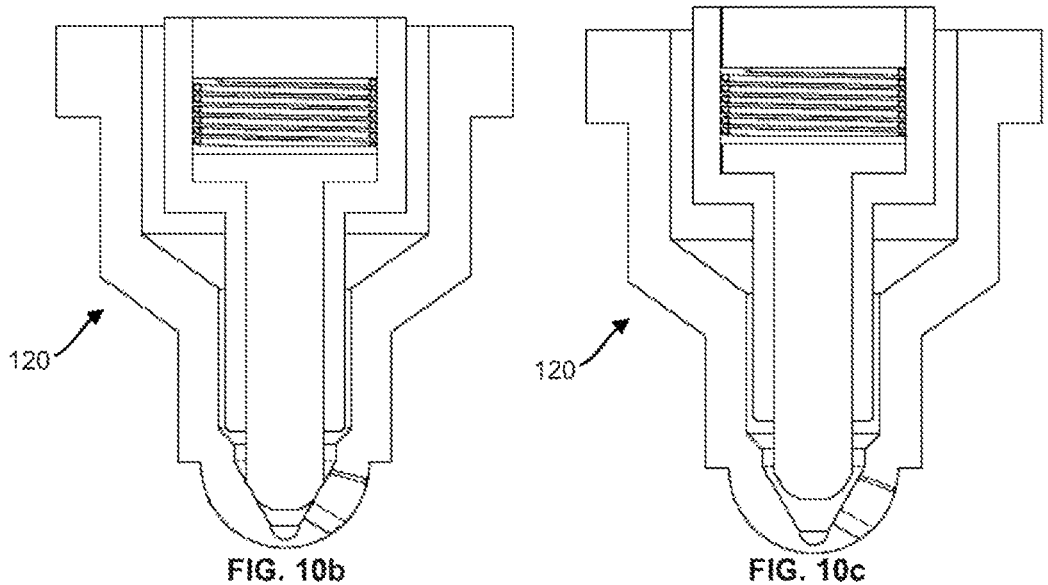

Referring now to the schematic view of FIGS. 10a, 10b and 10c, there is shown a fifth embodiment which is similar to the previous embodiments and like parts have like reference numerals and are not described in detail, if at all. Fuel injector 120 comprises pilot needle 311 that is concentric with main needle 312, both of which reciprocate within valve body 300 along a longitudinal axis. Valve 320 comprises tapered shoulder 340 on pilot needle 311 which forms a match fit with tapered shoulder 350 on body 300. When shoulder 340 is fully seated on shoulder 350 valve 320 is sealed with very little leakage, and preferably no leakage. Valve 330 comprises tapered shoulder 341 on main needle 312 which forms a match fit with tapered shoulder 351 of body 300. Similar to the corresponding valve discussed in previous embodiments valve 330 is not required to be sealed, but can be. An actuator (not shown), which can be similar to the types discussed in the previous embodiments, is employed to affect lift of both pilot needle 311 and main needle 312, as will be described in more detail below with additional references to FIGS. 11a through 11f. The closed position of injector 120 where both valves 320 and 330 are closed is illustrated in FIG. 10a. The first open position where valve 320 is open and valve 330 is closed is illustrated in FIG. 10b. The second open position where both valves 320 and 330 are open is illustrated in FIG. 10c. In the closed position a spring force from the actuator (not shown) keeps pilot needle 311 seated and valve 320 closed, and fuel is blocked from entering combustion chamber 150 as shown in FIG. 11a. Captive spring 605 keeps main needle 312 seated and valve 330 closed during the closed position. During the first stage injection event electronic controller 140 commands the actuator to lift pilot needle 311 to the first open position such that valve 320 is open and gas flows through passageway 460, as shown in FIGS. 11b and 11c. A gap 610 between pilot annular surface 620 and main annular surface 630 prevents pilot needle 311 from coming into contact with main needle 312, and valve 330 remains closed due to captive spring 605 and substantially no fuel flows through passageway 480. In the first open position, valve 330 has less leakage then the corresponding valve in previous embodiments. Controller 140 can command the actuator to lower pilot needle 311 and close valve 320 as shown in FIG. 11d such that the pilot fuel has more time to mix and heat up if required before proceeding to the main fuel injection. During the second stage injection event electronic controller 140 commands the actuator to lift pilot needle 311 such that it closes the gap 610 between annular surfaces 620 and 630 and the lifting force is transferred to main needle 312 which then opens against the bias of captive spring 605. With both valves 320 and 330 now opened fuel flows through both passageways 460 and 480 as illustrated in FIGS. 11e and 11f.

The above described embodiments do not require a second type of fuel to be employed as the pilot fuel, and are simpler in design and cost since two fuels do not need to be delivered to the combustion chamber. There is a strong potential to achieve lower emission and better performance than both the conventional pilot fuel and glow plug systems. Also, the illustrated embodiments allow full run-on-diesel capability using the same injection system. For example, the pilot passageways 460 can be employed to inject up to 100% diesel and still be able to atomize the diesel sufficiently well due to the small size of the pilot holes.

In yet another embodiment there can be co-injections of other fuels that improve the ignitability of the gaseous fuel. For example, when the gaseous fuel comprises methane, there can be co-injections of either hydrogen or diesel fuel in which the resulting mixture will have reduced ignition delay and therefore increased ignitability. This also allows reduced loading on heating element 500. It has been shown that certain mixtures of methane and hydrogen result in a reduced temperature of heated surface 510 of approximately 100° C. Although the co-injections improve ignitibility, they are not required for ignition of the gaseous fuel according to the previously described embodiments. The co-injections of the other fuels can be through a second fuel injector which can inject the other fuels directly into combustion chamber 150 or into intake air manifold 180 upstream of intake valve 190, or the gaseous fuel can be premixed with the other fuels and the resulting mixture can be injected through fuel injector 120 as previously discussed. When the other fuel is diesel, then the diesel fuel can be directly introduced to combustion chamber 150 through the second fuel injector. When the other fuel is hydrogen, the hydrogen can be injected with the second fuel injector either directly into combustion chamber 150 or upstream of intake valve 190, or the hydrogen can be premixed with the gaseous fuel and introduced through injector 120, or the hydrogen can be stored separately from the gaseous fuel and mixed in a predetermined proportion with the gaseous fuel by controller 140 according to engine operating conditions.

Figure 12:
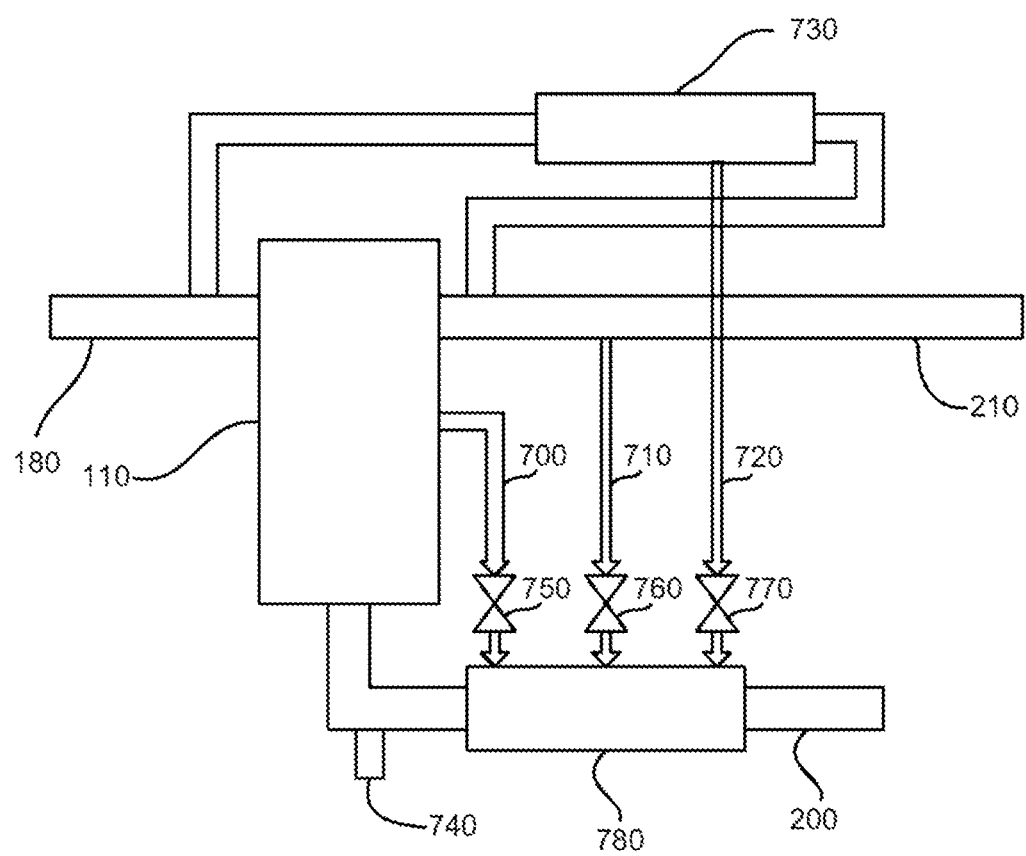
FIG. 12 is a partial schematic view of a system for heating the gaseous fuel before injection in the internal combustion engine of FIG. 1.

Further improvements to the above described embodiments can be obtained by improving the robustness of the ignition of the pilot fuel by heating it before entry into the combustion chamber. This reduces the load requirement for heating element 500. That is, if the pilot fuel has a higher temperature at the start of injection then element 500 and surface 510 do not have to work as much to increase the temperature of the pilot fuel for ignition to occur. This extends the operating life of heating element 500 and surface 510, which has been a key challenge with monofuel direct injection technology. Similarly, if the pilot fuel can be cracked such that the fuel has more readily ignitable chemical species, for example acetylene, it would improve ignition and further reduce the load requirement for element 500. With reference to FIG. 12, waste heat from engine 110 can be used for both heating the gaseous fuel and cracking the gaseous fuel. Waste heat from engine coolant 700, exhaust gases 710 in exhaust manifold 210 and exhaust gas 720 in EGR 730 can be utilized to heat and crack the gaseous fuel in supply conduit 200 through heat exchanger 780. A temperature sensor 740 provides a temperature signal to electronic controller 140 such that electronic controller can selectively actuate control valves 750, 760 and 770. The temperature of the gaseous fuel can be controlled to heat the gaseous fuel and to crack the gaseous fuel. When cracking the gaseous fuel heat exchanger 780 provides a reduced oxygen content environment and preferably no oxygen such that the gaseous fuel does not ignite due to temperatures required for cracking. Heat exchanger 780 can also comprise an electric heater that is actuatable by controller 140 and which allows the gaseous fuel to be heated independently from waste heat. This is advantageous during engine start-up, and especially in cold environments.

Figure 17A:
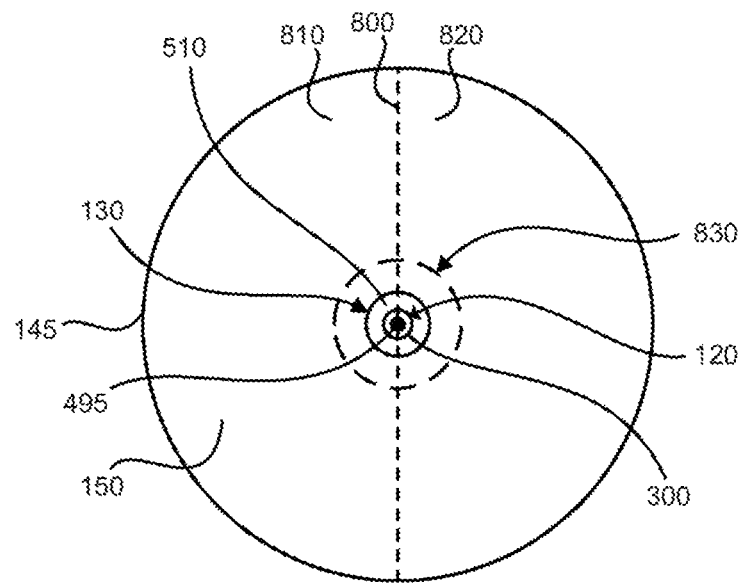
FIG. 17a is a plan view of the combustion chamber of FIG. 1 according to the first embodiment.
Figure 17B:
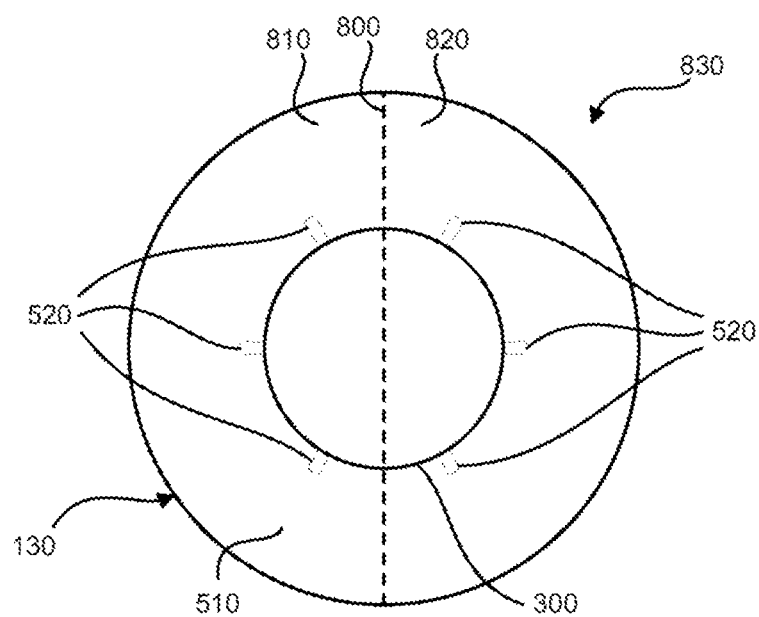
FIG. 17b is a plan view of detail 830 of FIG. 17a illustrating the introduction of pilot fuel through pilot jets.
Figure 17C:
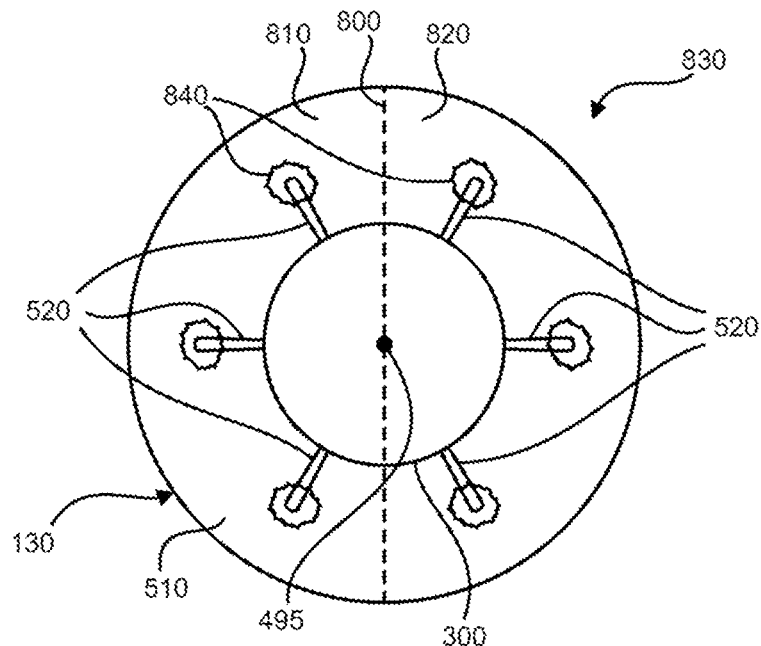
FIG. 17c is a plan view of detail 830 of FIG. 17a further along in time than FIG. 17b illustrating combustion zones around each pilot jet.

Returning to the first embodiment (FIGS. 2-5), FIGS. 17*a* through 17*e* illustrate plan views of the operation of this embodiment. Referring first to FIG. 17*a*, combustion chamber 150 (defined in part by cylinder wall 145) is divided into a first hemisphere 810 and a second hemisphere 820 by line 800. Heated surface 510 extends annularly around nozzle 300. Although the first embodiment disclosed injector 120 as illustrated in FIG. 2, any of the injectors in FIGS. 2, 9 and 10 can be employed. As discussed previously, in the first stage injection event injector 120 is actuated to introduce pilot jets 520 into both hemispheres 810 and 820 of combustion chamber 150 as seen in FIG. 17*b*. There are six pilot jets 520 illustrated, but in other embodiments there are at least two pilot jets 520, and at least one pilot jet is injected into each hemisphere 810 and 820. It is preferable that pilot jets 520 are angularly spaced equally around nozzle 300, within a predetermined range of tolerance, such that combustion of the pilot fuel, as illustrated in FIG. 17*c*, creates a homogenous ignition environment in combustion chamber 150 for the main fuel. When there are only two pilot jets 520, the homogeneity of the ignition environment created by their combustion is increased the greater the jets are angularly spaced apart about axis 495. It is preferable that these two pilot jets 520 are so spaced that each jet creates a homogenous ignition environment in respective hemispheres 810 and 820 when ignited. A homogenous ignition environment refers to an even temperature gradient across combustion chamber 150 and hemispheres 810 and 820, within a range of tolerance, and an even distribution of hot combustion by-products (hot gasses), within a range of tolerance, that are formed when pilot fuel ignites. Both the combustion chamber temperature and combustion by-products support the ignition of main fuel. Internal combustion engines that employ glow plugs for ignition of gaseous pilot fuel do not create a homogenous ignition environment for main fuel. First, there is a significant temperature gradient across the combustion chamber when fuel is ignited since combustion occurs in a sector of the combustion chamber where the glow plug is installed and not elsewhere. Second, the combustion by-products concentrate in the sector where the glow plug is located and therefore their support of ignition of main fuel in other regions of the combustion chamber is reduced. The consequence of glow plug operation is over-leaning of the main fuel injected furthest from the glow plug which increases unburned hydrocarbon emissions.

Figure 17D:
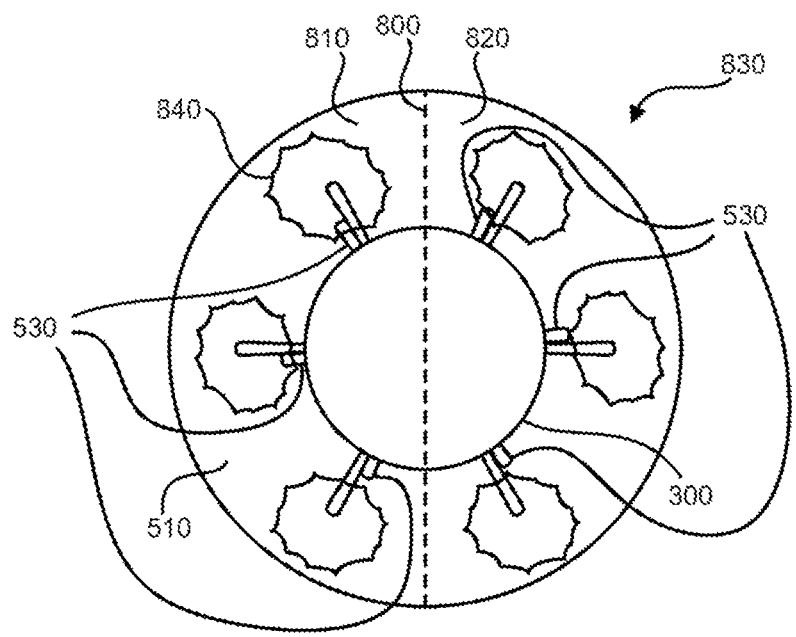
FIG. 17d is a plan view of detail 830 of FIG. 17a further along in time than the view of FIG. 17c illustrating the introduction of main fuel through main jets.
Figure 17E:
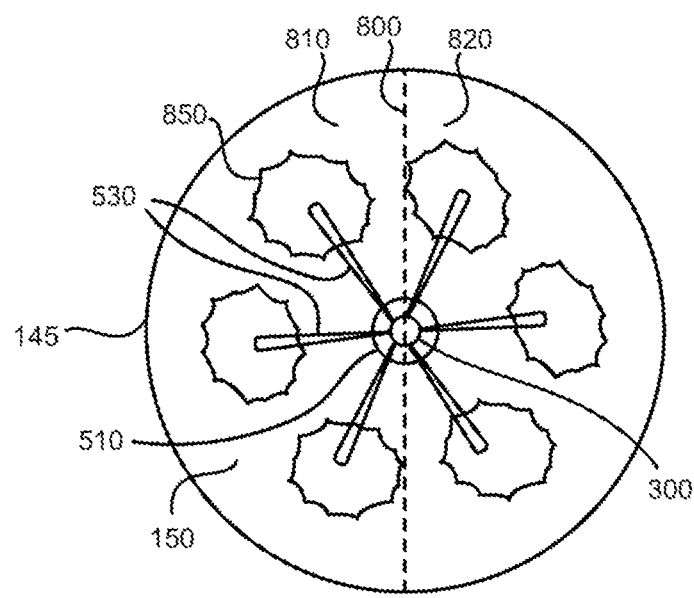
FIG. 17e is a plan view of the combustion chamber of FIG. 17a further along in time than the view of FIG. 17d illustrating combustion zones around each main jet.

Returning to FIG. 17*c*, pilot fuel ignites due to auto-ignition and combustion zones 840 form around each pilot jet 520. Referring to FIG. 17*d*, injector 120 is actuated for the second injection event and main jets 530 are introduced locally to pilot jets 520. Although one main jet 530 is shown for each pilot jet 520, a one to one mapping of pilot jets and main jets is not required. Each main jet 530 is ignited independently, as seen in FIG. 17*e*, due to the homogenous ignition environment created by combustion of pilot fuel and combustion zones 850 form around each of the main jets. Due to the homogenous ignition environment the likelihood of main jets 530 becoming overly lean is considerably reduced, and preferably prevented. Note that in glow plug operation there is a cascading effect of combustion of both pilot fuel and main fuel. For example, in glow plug operation when the main jets are introduced to the combustion chamber the main jets directed closest to the glow plug ignite first, and the combustion zone created by the main jet (comprising both a temperature gradient and hot combustion gasses) ignites the adjacent main jet, and so on in a cascading fashion. This results in over-leaning of the main jets furthest from the glow plug due to the delayed ignition and the subsequent increase in unburned hydrocarbons when they ignite.

Figure 18A:
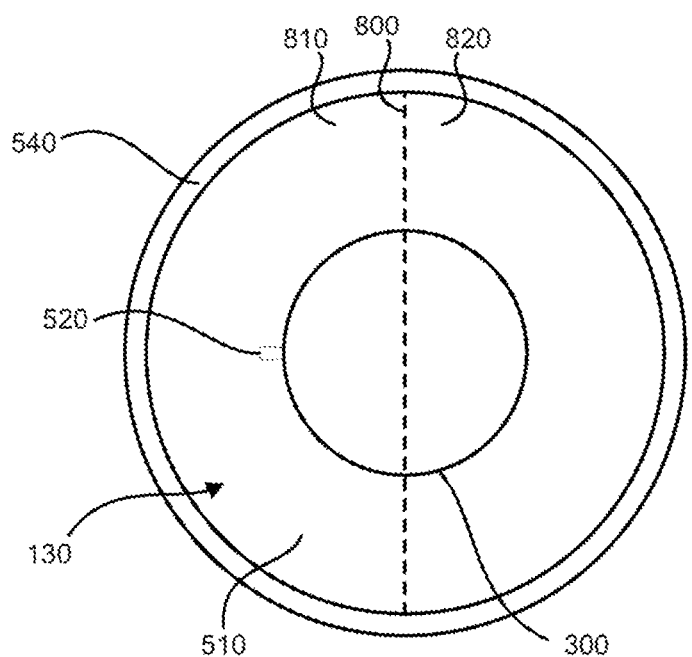
FIG. 18a is a plan view of detail 830 of FIG. 17a according to the second embodiment further illustrating a diverting and retaining member and one pilot jet.
Figure 18B:
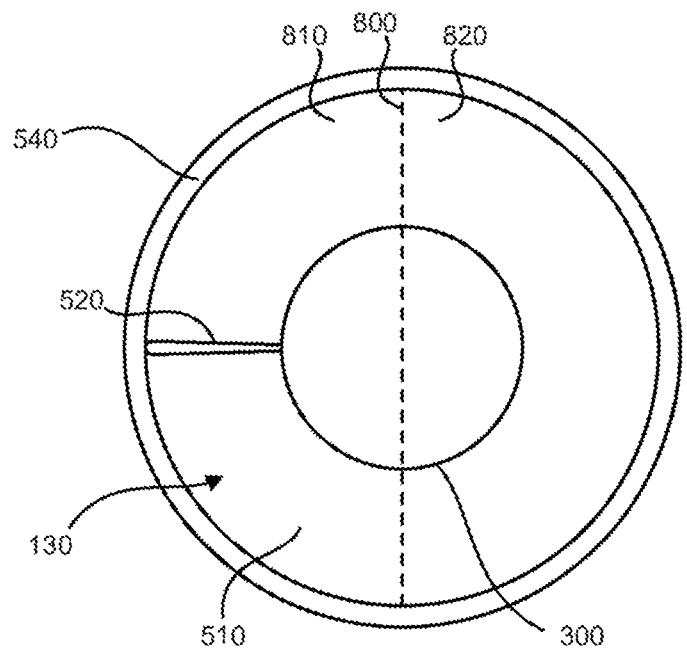
FIG. 18b is a plan view further along in time than the view of FIG. 18a illustrating the pilot jet impacting the diverting and retaining member.
Figure 18C:
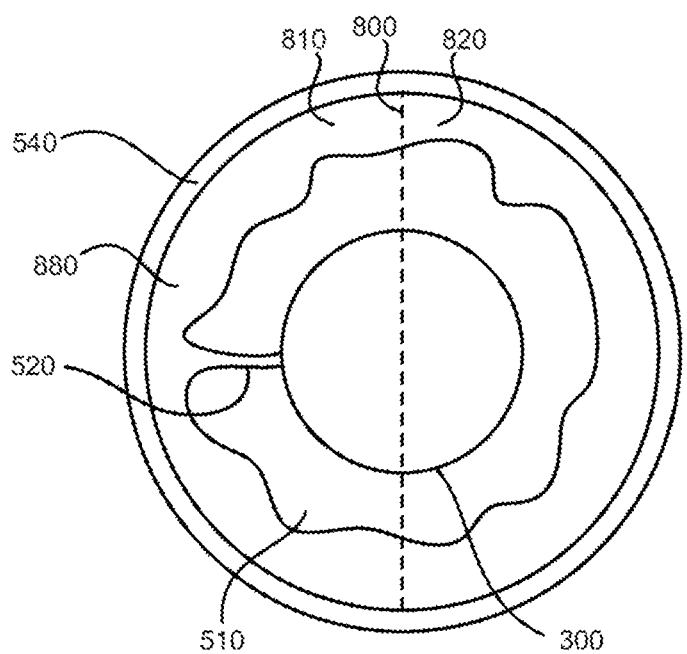
FIG. 18c is a plan view further along in time than the view of FIG. 18b illustrating the pilot jet forming a pilot plum around a fuel injector nozzle.
Figure 18D:
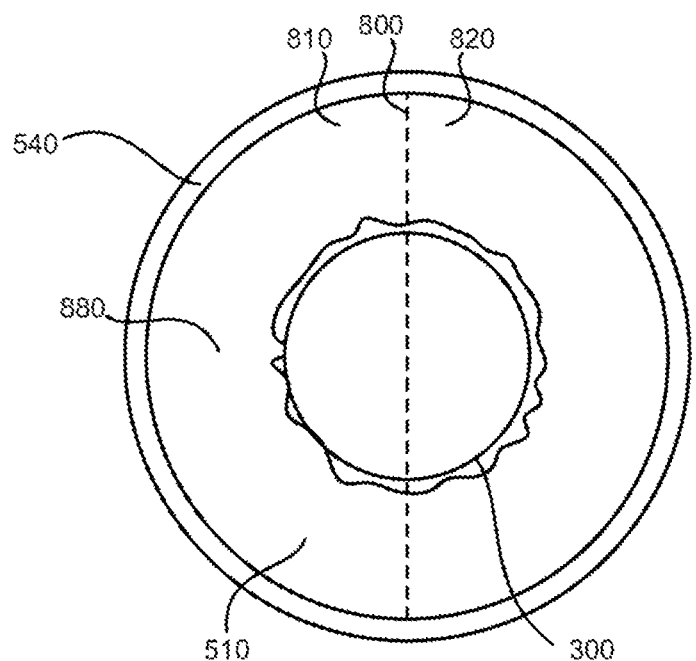
FIG. 18d is a plan view further along in time than the view of FIG. 18c illustrating the pilot plum enveloping a heated surface around the fuel injector nozzle.
Figure 18E:
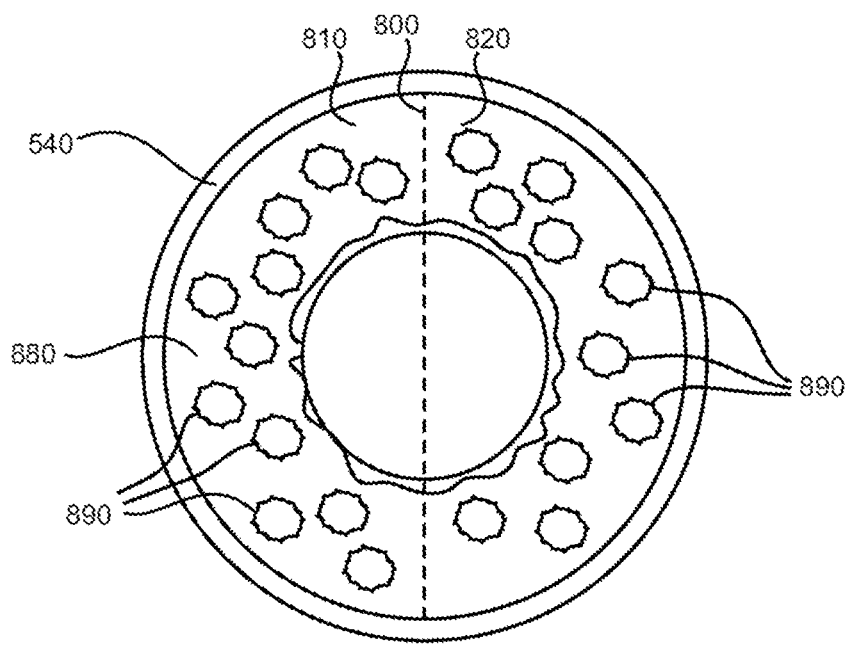
FIG. 18e is a plan view further along in time than the view of FIG. 18d illustrating combustion zones within the pilot plume that envelopes the heated surface.

Returning to the second embodiment (FIG. 6), FIGS. 18*a* through 18*e* illustrate plan views of the operation of this embodiment when there is only one pilot jet 520. Referring first to FIG. 18*a*, diverting and retaining member 540 extends annularly around heated surface 510 and nozzle 300. In FIG. 18*b*, pilot jet 520 impinges member 540 and due to its velocity gets redirected around nozzle 300 creating pilot plume 880 that soon expands substantially over the entire heated surface 510 as illustrated in FIGS. 18*c* and 18*d*. In other embodiments there can be a plurality of pilot jets 520, preferably equally spaced within a predetermined range of tolerance about axis 495, that form plume 880. An ignition event, which can be auto-ignition due to heat from heated surface 510 or a spark due to sparking mechanism 545 illustrated in FIG. 7, ignites the pilot fuel in plume 880 such that a homogenous ignition environment is created around nozzle 300 and combustion chamber 150 for the subsequent ignition of main jets 530 (not shown). As in the first embodiment, each main jet 530 ignites independently from other main jets (one main jet does not ignite another main jet). The timing of ignition and the amount of pilot fuel introduced prevents over-leaning of the pilot fuel prior to ignition. When the pilot fuel auto-ignites due to heated surface 510 a plurality of combustion zones 890 are created. When a spark ignites the pilot fuel then combustion zones are created in the vicinity of each spark which creates flame fronts that soon ignite the entire plume 880.

A first Computational Flow Dynamics (CFD) model was created to perform simulations to test whether pilot injection passageway 460 is necessary for ignition of the gaseous fuel. The engine configurations and conditions under which the first CFD model was tested are given in Table 1. The engine selected was a 13L HD engine with low swirl and no EGR. Two loading conditions were selected: a) Low Load 1200 RPM and b) High Load 1500 RPM. For both conditions EGR was set to zero and the amount of gaseous fuel injected through the pilot injection passageway varied between 5-10 mg/stroke and start of injection (SOI) was set to 30° BTDC. For the case of spark assisted ignition, as illustrated in the embodiment of FIG. 7, spark ignition was simulated by heating a very small volume (1 mm$^3$) of the fuel-air mixture to 2000K at the time of spark ignition.

TABLE 1

| Variable | Value |
| --- | --- |
| IMEP Target [bar] | 23 |
| RPM | 1200, 1500 |
| Compression Ratio | 15.7 |
| IMT [K] | 320 |

Two additional CFD models with different configurations for introduction of pilot fuel were created to compare with the first CFD model (which is representative of the embodiments previously discussed). In a second CFD model, injections of pilot fuel were performed through main injection passageway 480 and were directed near heated surface 510. In a third CFD model, two pilot injection passageways were employed to simulate the effect of glow plug operation where of the two fuel jets only one jet is ignited by the glow plug and the other fuel jet ignites through interaction with the one jet. The second and third CFD models employed a pilot injection pulse identical to that of the first CFD model. The results of the tests are illustrated in FIG. 13. Two pilot fuel flow rates were employed, as specified in the column labelled "Pilot Flow Rate" in FIG. 13. The pilot fuel flow rate depends on not only the injection pressure and size of passageway 460, but also the lift profile of needle 310. Needle 310 can be partially lifted by providing a short pulse such that peak pilot fuel flow rate will be lower than that when the needle is fully lifted. A lower pilot fuel flow rate (LPFR) is beneficial for ignition and UHC emission since it increases the residence time and reduces the amount of fuel that gets overly leaned prior to ignition. As shown in the last column ignition failed to occur for the second and third CFD models. The fuel-air mixture near the heated surface due to gaseous fuel injection through the main injection passageway, as in the second CFD model, has significantly shorter residence time compared to the first CFD model. As a result, the mixture becomes overly lean by the time the near-surface temperature rises sufficiently high for ignition to occur. The flame fails to propagate and the ignition of the fuel-air mixture from the main injection passageway due to the subsequent main fuel injection cannot proceed. Ignition also failed to occur for the first CFD model under the high load condition when the temperature of heated surface 510 was 1600K and the first stage injection event occurred at 30° BTDC. These tests confirmed the expectation that pilot injection passageway 460 is necessary to ignite the main fuel.

The results tabulated in FIG. 13 show that ignition can be achieved with a heated surface temperature down to 1600K under the conditions tested. However, while operating at high load where the injection pressure is relatively high and when heated surface 510 temperature is 1600K, it is necessary to have a two stage pilot injection (one at 50° BTDC and the other at 30° BTDC) to establish the pilot flame, since a single pilot fuel injection at 30° BTDC failed to ignite the main gas injection. It should be noted that simulation with multiple sparks shows short ignition delay time from the start of pilot injection and a more robust pilot flame kernel.

Figure 14A:
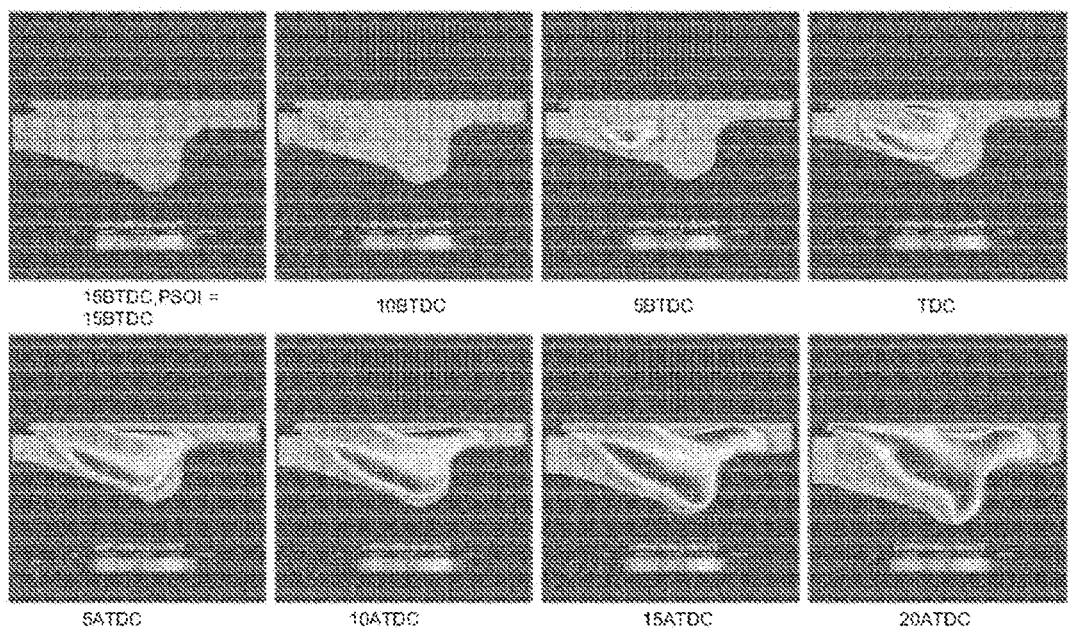
FIG. 14a is a simulation diagram illustrating CFD simulation results for an ignition process in an HPDI engine wherein a second fuel such as diesel ignites a gaseous fuel such as natural gas.
Figure 14B:
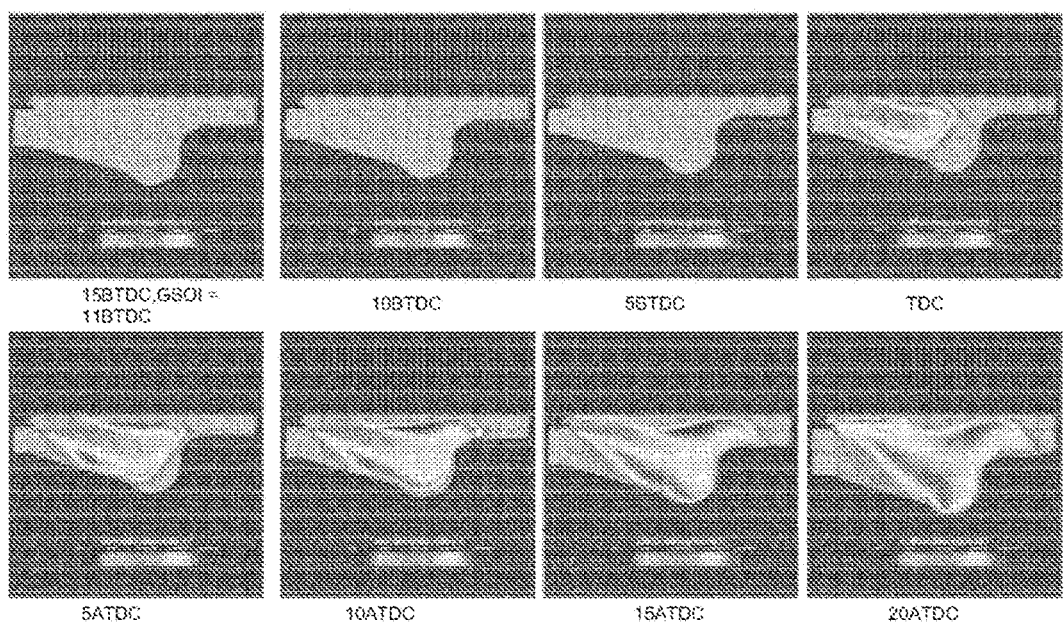
FIG. 14b is a simulation diagram illustrating CFD simulation results for a heated surface ignition process according to the embodiment of FIG. 1.
Figure 14C:
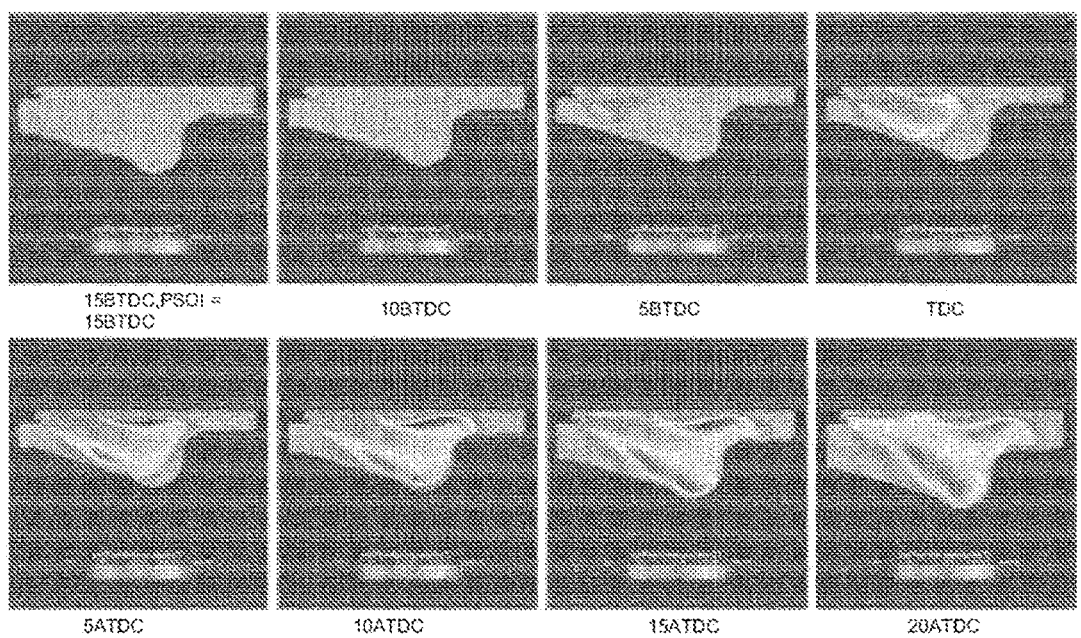
FIG. 14c is a simulation diagram illustrating CFD simulation results for a spark assisted ignition process according to the embodiment of FIG. 7.
Figure 15A:
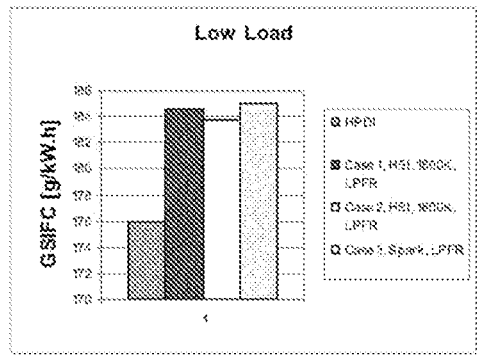
FIG. 15a is a simulation result chart illustrating gross indicated specific fuel consumption (GISFC) for the case 1, 2 and 3 ignition processes of FIG. 13 and an HPDI ignition process of an engine operating at low load.
Figure 15B:
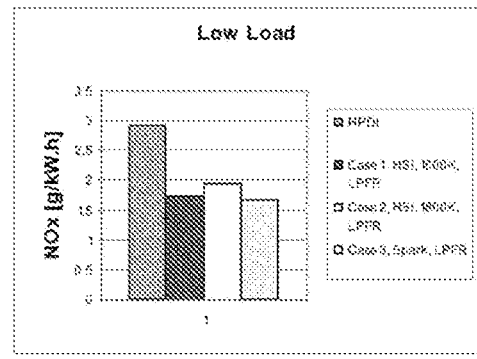
FIG. 15b is a simulation result chart illustrating NOx emission levels for the case 1, 2 and 3 ignition processes of FIG. 13 and the HPDI ignition process of the engine operating at low load.
Figure 15C:
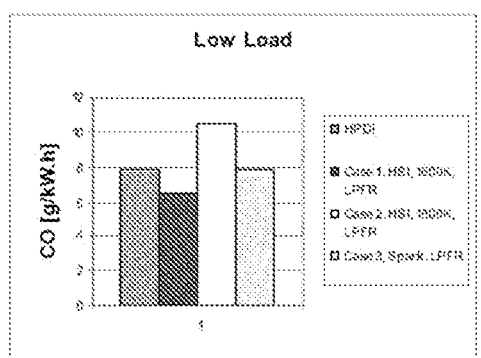
FIG. 15c is a simulation result chart illustrating CO emission levels for the case 1, 2 and 3 ignition processes of FIG. 13 and the HPDI ignition process of the engine operating at low load.
Figure 15D:
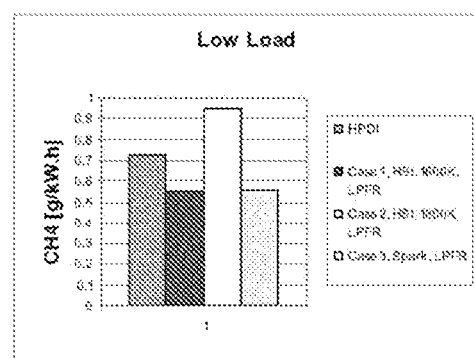
FIG. 15d is a simulation result chart illustrating CH4 emission levels for the case 1, 2 and 3 ignition processes of FIG. 13 and the HPDI ignition process of the engine operating at low load.
Figure 15E:
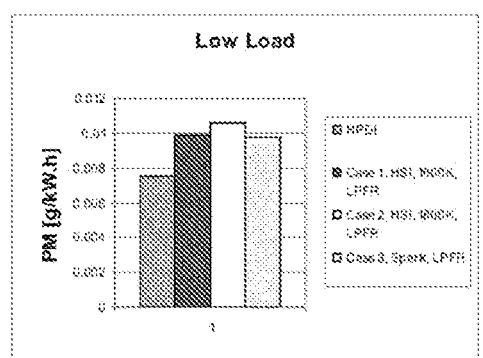
FIG. 15e is a simulation result chart illustrating particulate matter emission levels for the case 1, 2 and 3 ignition processes of FIG. 13 and the HPDI ignition process of the engine operating at low load.

Referring now to FIGS. 14a through 14c, a comparison of ignition processes is illustrated for high load conditions. FIG. 14a illustrates the ignition process for high pressure direct injection (HPDI) where injections of gaseous fuel are ignited by pilot injections of diesel fuel. FIG. 14b illustrates the ignition process for the embodiment of FIG. 2. FIG. 14c illustrates the ignition process for the embodiment of FIG. 7. Both the ignition process for FIGS. 14b and 14c employed the first CFD model described above.

Gross indicated specific fuel consumption (GISFC) and emissions for the simulation results in FIG. 13 are illustrated in FIGS. 15a through 15e while operating at low load, and in FIGS. 16a through 16e while operating at high load. In each of the charts, the bars labelled 'HPDI' refers to simulation results for the HPDI ignition strategy for an HPDI CFD model. The remaining bars are labelled by the case number in FIG. 13. A review of FIGS. 15a to 15e and 16a to 16e indicates that HPDI has slightly better fuel economy than the embodiments of the first CFD model. However, it should be noted that the simulations were performed for a fixed main gas SOI. The start of combustion timing for the main gas injection is typically later for the first CFD model compared to HPDI at given SOI due to the slower ignition process. The efficiency of the first CFD model can be improved with an advanced main gas SOI timing to the extent of matching the HPDI NOx level. With the combustion timing adjusted, the thermal efficiency of the simulation results from the first CFD model is likely to be comparable to that of HPDI.

Figure 16A:
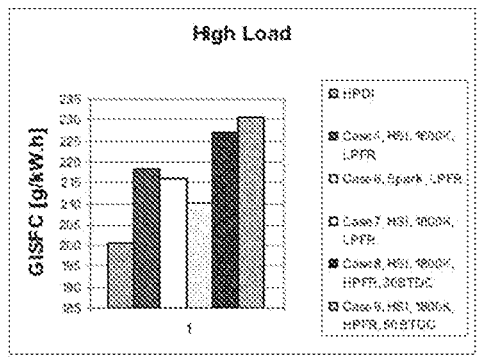
FIG. 16a is a simulation result chart illustrating gross indicated specific fuel consumption (GISFC) for the case 4, 6, 7, 8 and 9 ignition processes of FIG. 13 and the HPDI ignition process of the engine operating at high load.
Figure 16B:
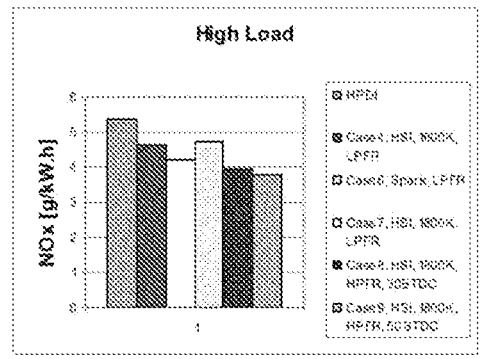
FIG. 16b is a simulation result chart illustrating NOx emission levels for the case 4, 6, 7, 8 and 9 ignition processes of FIG. 13 and the HPDI ignition process of the engine operating at high load.
Figure 16C:
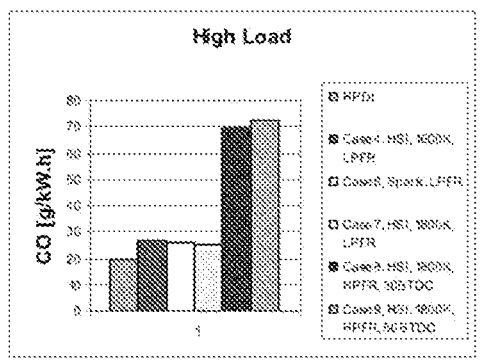
FIG. 16c is a simulation result chart illustrating CO emission levels for the case 4, 6, 7, 8 and 9 ignition processes of FIG. 13 and the HPDI ignition process of the engine operating at high load.
Figure 16D:
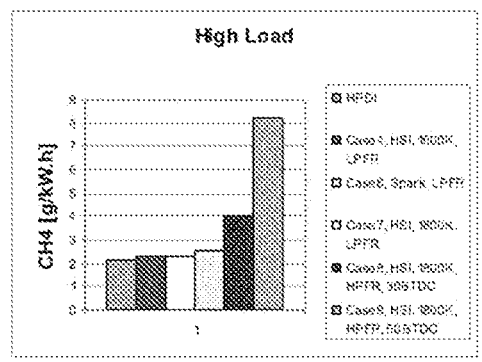
FIG. 16d is a simulation result chart illustrating CH4 emission levels for the case 4, 6, 7, 8 and 9 ignition processes of FIG. 13 and the HPDI ignition process of the engine operating at high load.
Figure 16E:
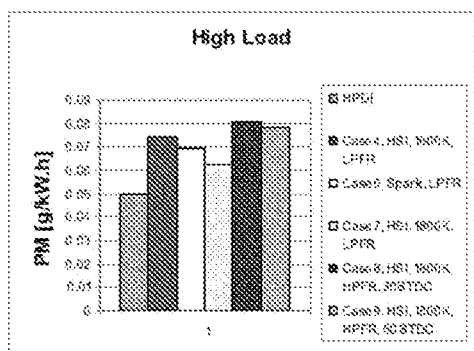
FIG. 16e is a simulation result chart illustrating particulate matter emission levels for the case 4, 6, 7, 8 and 9 ignition processes of FIG. 13 and the HPDI ignition process of the engine operating at high load.

Conventional hydrocarbon (methane) emission from a glow-plug-ignited natural gas direct injection engine is higher than a HPDI engine. In the current study, it has been found that methane emission is particularly sensitive to pilot flow rate as well as delay between pilot injection and main gas injection. An analysis of the UCH4 distribution shows that a significant fraction of the fuel injected during the pilot pulse is diluted beyond flame propagation limit during the ignition delay time. Increasing pilot flow rate and extending the delay time between pilot and main injections increase the fuel trapped in these pockets of over-leaned mixtures. They thus contribute to a high UCH4 emission. In general, for direct injection natural gas engines, excessive premixing and local over-leaning is a main reason for high CH4 emission. If the pilot flow rate can be kept low to minimize the effect of over penetration and over-leaning, the UCH4 can be reduced to a level comparable to that of HPDI as shown in FIG. 16d.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of igniting gaseous fuel directly introduced into a combustion chamber of an internal combustion engine comprising steps of:
   heating a space around a fuel injector nozzle;
   introducing a pilot amount of gaseous fuel through a pilot injection passageway in a fuel injector nozzle into said combustion chamber;
   igniting said pilot amount of gaseous fuel;
   introducing a main amount of gaseous fuel through a main injection passageway in said fuel injector nozzle into said combustion chamber;
   using heat from combustion of said pilot amount of gaseous fuel to ignite said main amount of gaseous fuel; and
   controlling gaseous fuel flow into said combustion chamber between said main amount of gaseous fuel and said pilot amount of gaseous fuel by providing a ratio between a main cross-sectional area of said main injection passageway and a pilot cross-sectional area of said pilot injection passageway within a range of 4 to 49.

2. The method of claim 1, wherein said gaseous fuel is natural gas.

3. The method of claim 1, wherein said gaseous fuel is selected from the group consisting of methane, propane, ethane, biogas, landfill gas, hydrogen and mixtures of these fuels.

4. The method of claim 1, further comprising absorbing heat around said fuel injector nozzle to assist with combustion of said pilot amount and said main amount.

5. The method of claim 1, wherein said igniting said pilot amount is by one of:
   heating a space around said fuel injector nozzle wherein said pilot amount auto-ignites; and
   spark igniting said pilot amount.

6. The method of claim 1, wherein said pilot amount is within a range of 2% to 20% of total gaseous fuel introduced.

7. The method of claim 1, wherein said pilot amount is within a range of 2% to 10% of total gaseous fuel introduced.

8. The method of claim 1, wherein said pilot amount is within a range of 2% to 8% of total gaseous fuel introduced.

9. The method of claim 1, wherein said pilot amount is introduced during a first stage injection event before said main amount is introduced.

10. The method of claim 9, wherein said main amount is introduced in a second stage injection event after said pilot amount ignites.

11. The method of claim 9, further comprising:
introducing a second pilot amount of said gaseous fuel before said first stage injection event; and
igniting said second pilot amount with an external ignition source whereby combustion of said second pilot amount heats said combustion chamber.

12. The method of claim 11, wherein said external ignition source is a spark.

13. The method of claim 1, further comprising impacting a pilot fuel jet emanating from said pilot injection passageway into said combustion chamber against a diverting and retaining member wherein said pilot amount is diverted around said fuel injector nozzle.

14. The method of claim 1, further comprising co-injecting a second fuel such that ignitability of said gaseous fuel is improved.

15. The method of claim 14, wherein said second fuel is introduced into said combustion chamber separately from said gaseous fuel.

16. The method of claim 14, wherein said second fuel forms a mixture with said gaseous fuel, and said mixture is introduced into said combustion chamber.

17. The method of claim 1, wherein said ratio is within a range of 9 to 49.

18. The method of claim 1, wherein said ratio is within a range of 11.5 to 49.

19. A method of igniting gaseous fuel directly introduced into a combustion chamber of an internal combustion engine comprising steps of:
heating a space around a fuel injector nozzle;
introducing a main amount of gaseous fuel through a main injection passageway in a first fuel injector nozzle into said combustion chamber;
introducing a pilot amount of gaseous fuel through a pilot injection passageway in a second fuel injector nozzle into said combustion chamber;
igniting said pilot amount of gaseous fuel;
using heat from combustion of said pilot amount of gaseous fuel to ignite said main amount of gaseous fuel; and
controlling gaseous fuel flow into said combustion chamber between said main amount of gaseous fuel and said pilot amount of gaseous fuel by providing a ratio between a main cross-sectional area of said main injection passageway and a pilot cross-sectional area of said pilot injection passageway within a range of 4 to 49.

20. The method of claim 19, wherein said main amount is introduced into an intake manifold upstream from an intake valve of said combustion chamber.

21. The method of claim 19, wherein said ratio is within a range of 9 to 49.

22. The method of claim 19, wherein said ratio is within a range of 11.5 to 49.

23. An apparatus for igniting gaseous fuel in a combustion chamber of an internal combustion engine comprising:
a fuel injector for directly introducing gaseous fuel into said combustion chamber; said fuel injector comprising a nozzle and having a pilot injection passageway and a main injection passageway, said pilot injection passageway comprising a pilot cross-sectional area perpendicular to gaseous fuel flow therethrough, and said main injection passageway comprising a main cross-sectional area perpendicular to gaseous fuel flow therethrough, a ratio of said main cross-sectional area to said pilot cross-sectional area is within a range of 4 to 49;
an ignition source comprising a heated surface extending annularly around the nozzle of the fuel injector;
a controller operatively connected with said fuel injector and said ignition source and configured to:
actuate said fuel injector to introduce a pilot amount of gaseous fuel through said pilot injection passageway forming a pilot jet;
actuate said ignition source to ignite said pilot jet; and
actuate said fuel injector to introduce a main amount of gaseous fuel through said main injection passageway forming a main jet wherein said main jet ignites due to heat from combustion of said pilot jet.

24. The apparatus of claim 23, wherein the gaseous fuel is natural gas.

25. The apparatus of claim 23, wherein said gaseous fuel is selected from the group consisting of methane, propane, ethane, biogas, landfill gas, hydrogen and mixtures of these fuels.

26. The apparatus of claim 23, wherein said ratio is within a range of 9 to 49.

27. The apparatus of claim 23, wherein said ratio is within a range of 11.5 to 49.

28. The apparatus of claim 23, wherein said ignition source comprises a sparking mechanism.

29. The apparatus of claim 23, wherein said ignition source comprises a heating coil.

30. The apparatus of claim 23, wherein said ignition source comprises an induction heater.

31. The apparatus of claim 23, wherein said pilot amount is introduced during a first stage injection event and said main amount is introduced during a second stage injection event, and said controller is further configured to:
actuate said fuel injector to introduce a second pilot amount of gaseous fuel through said pilot injection passageway before said first stage injection event; and
actuate a sparking mechanism to spark ignite said second pilot amount of said gaseous fuel;
wherein heat from combustion of said second pilot amount assists with ignition of said pilot amount.

32. The apparatus of claim 23, further comprising a diverting and retaining member operable to divert flow of said pilot jet around said fuel injector.

33. The apparatus of claim 23, further comprising a second fuel injector for introducing a second fuel directly into said combustion chamber, said controller further configured to actuate said second fuel injector.

34. The apparatus of claim 33, wherein said second fuel is selected from the group consisting of hydrogen and diesel.

35. The apparatus of claim 23, further comprising a heat absorbent layer extending annularly around said fuel injector.

36. An apparatus for igniting a gaseous fuel in a combustion chamber of an internal combustion engine comprising:

a first fuel injector for directly introducing said gaseous fuel into said combustion chamber, said first fuel injector comprising a pilot injection passageway, said pilot injection passageway comprising a pilot cross-sectional area perpendicular to gaseous fuel flow therethrough;

an intake valve upstream from said combustion chamber;

a second fuel injector for introducing said gaseous fuel upstream from said intake valve and comprising a main injection passageway, said main injection passageway comprising a main cross-sectional area perpendicular to gaseous fuel flow therethrough, a ratio of said main cross-sectional area to said pilot cross-sectional area is within a range of 4 to 49;

an ignition source;

a controller operatively connected with said first and second fuel injectors and configured to:

actuate said second fuel injector to introduce a main amount of said gaseous fuel whereby said main amount forms a premixed mixture in said combustion chamber; and actuate said first fuel injector to introduce a pilot amount of said gaseous fuel through said pilot injection passageway.

37. The apparatus of claim 36, wherein said ratio is within a range of 9 to 49.

38. The apparatus of claim 36, wherein said ratio is within a range of 11.5 to 49.

39. The apparatus of claim 36, wherein said ignition source comprises a sparking mechanism.

40. The apparatus of claim 36, wherein said ignition source comprises a heating coil.

41. The apparatus of claim 36, wherein said ignition source comprises an induction heater.

42. The apparatus of claim 36, further comprising a heat absorbent layer extending annularly around said first fuel injector.

* * * * *